US012044345B2

United States Patent
O'Neil et al.

(10) Patent No.: US 12,044,345 B2
(45) Date of Patent: Jul. 23, 2024

(54) DROP IN FIRE STOP ASSEMBLY

(71) Applicant: Reliance Worldwide Corporation, Atlanta, GA (US)

(72) Inventors: Virgil O'Neil, Poway, CA (US); Jacob Chase, Poway, CA (US); James Cosley, Poway, CA (US)

(73) Assignee: RELIANCE WORLDWIDE CORPORATION, Atlanta, GA (US)

( * ) Notice: Subject to any disclaimer, the term of this patent is extended or adjusted under 35 U.S.C. 154(b) by 210 days.

(21) Appl. No.: 17/788,928

(22) PCT Filed: Jan. 22, 2021

(86) PCT No.: PCT/US2021/014738
§ 371 (c)(1),
(2) Date: Jun. 24, 2022

(87) PCT Pub. No.: WO2021/150977
PCT Pub. Date: Jul. 29, 2021

(65) Prior Publication Data
US 2023/0033042 A1 Feb. 2, 2023

Related U.S. Application Data

(60) Provisional application No. 62/964,978, filed on Jan. 23, 2020.

(51) Int. Cl.
*F16L 5/04* (2006.01)
*A62C 2/06* (2006.01)
*F16L 5/10* (2006.01)

(52) U.S. Cl.
CPC ............... *F16L 5/04* (2013.01); *A62C 2/065* (2013.01); *F16L 5/10* (2013.01)

(58) Field of Classification Search
CPC .... F16L 5/04; F16L 5/10; A62C 2/065; E04B 1/947; E04B 9/08; E04B 2/7411; H02G 3/0412; H02G 3/22
(Continued)

(56) References Cited

U.S. PATENT DOCUMENTS 4,496,790 A 1/1985 Spencer
4,894,966 A * 1/1990 Bailey .................... A62C 2/065
52/220.8

(Continued)

OTHER PUBLICATIONS

PCT International Search Report for PCT Application No. PCT/US2021/014738 mailed Apr. 1, 2021 (2 pages).
(Continued)

*Primary Examiner* — Brian E Glessner
*Assistant Examiner* — Adam G Barlow
(74) *Attorney, Agent, or Firm* — Barnes & Thornburg LLP

(57) ABSTRACT

A concrete floor has a pipe passing through a hole in the floor. A drop-in fire stop assembly has a clam-shell configuration having first and second portions of a fire ring, split cage, split retainer ring, split intumescent ring, split inner smoke ring and split outer smoke ring each fastened together to rotate about a hinge on the split cage to open and close. The first and second portions have free ends that spread apart to fit around the tube in an open position, and close around the tube in a closed position. A latch on the free ends of the cage hold the two portions together in the closed position.

23 Claims, 14 Drawing Sheets

(58) Field of Classification Search
USPC .......................................................... 52/232
See application file for complete search history.

(56) References Cited

U.S. PATENT DOCUMENTS

| | | | | |
|---|---|---|---|---|
| 4,951,442 | A | 8/1990 | Harbeke, Jr. | |
| 6,725,615 | B1* | 4/2004 | Porter | A62C 2/065 |
| | | | | 52/99 |
| 7,080,486 | B2* | 7/2006 | Radke | E04G 15/061 |
| | | | | 52/220.8 |
| 7,569,776 | B2 | 8/2009 | Jolly et al. | |
| 8,689,504 | B2 | 4/2014 | Monden et al. | |
| 9,586,066 | B2* | 3/2017 | Klein | H02G 3/0412 |
| 2003/0192269 | A1* | 10/2003 | Radke | H02G 3/22 |
| | | | | 52/220.8 |
| 2008/0053697 | A1* | 3/2008 | Bowman | H02G 3/185 |
| | | | | 174/483 |
| 2013/0086856 | A1* | 4/2013 | Paetow | A62C 2/065 |
| | | | | 52/232 |
| 2013/0104475 | A1* | 5/2013 | Foerg | A62C 2/065 |
| | | | | 52/232 |
| 2015/0121782 | A1* | 5/2015 | McConnell | H02G 3/22 |
| | | | | 52/232 |
| 2015/0121783 | A1 | 5/2015 | McConnell et al. | |
| 2021/0222802 | A1* | 7/2021 | Nousiainen | F16L 5/04 |

OTHER PUBLICATIONS

PCT Written Opinion for PCT Application No. PCT/US2021/014738 mailed Apr. 1, 2021 (6 pages).

* cited by examiner

DROP IN FIRE STOP ASSEMBLY

RELATED APPLICATION

The present application is a National Stage Application of PCT/US2021/014738, filed 22 Jan. 2021, which claims priority to U.S. Provisional Patent App. Ser. 62/964,978, filed on Jan. 23, 2020, entitled DROP IN FIRE STOP, the entire contents of which are incorporated herein by reference in their entireties.

BACKGROUND

The present invention relates generally to fire stop devices used in concrete walls and floors. Building regulations may require a fire activated seal in passages through concrete walls and floors. Poke-through assemblies are known that are suspended from the top side of a concrete floor and inserted into a passage so that expandable intumescent ring can block electrical conduits previously fastened to the poke-through assemblies, such as those disclosed in U.S. Pat. Nos. 4,496,790 and 7,569,776. But these poke-through assemblies already contain the tube which is to pass through the concrete and thus do not lend themselves to providing a fire stop seal around a preexisting tube or tubes already passing through a hole in the concrete. Moreover, Fire stop devices are also known that are suspended from the top side of a concrete floor fit to inside a passage through the concrete with intumescent material at two different axial locations, one on the inside and one on the outside the device, in order to block bye passage by having the intumescent material expand inward at one location and expand outward at another location, with the tube or tubes passed through the devices after they are suspended from the top of the concrete surface. One such device is described in U.S. Pat. No. 8,689,504. But these devices also do not lend themselves to providing a fire stop around a preexisting tube or tubes already passing through a hole in the concrete, and the axially spaced-apart location of the intumescent rings which must expand in opposing directions from different axial locations, complicates sealing of the passage and may impede the effectiveness of the passage seal. There is thus a need for an improved way to retrofit suspended fire-blocking material inside tubular passages through concrete floors where the passages are partially blocked by members extending through the passages.

As the fire stop devices or assemblies are provided as safety devices for use in case of a fire, there is also a continuing need for an improved fire stop device or assembly that is easier to make or install or that provides an improved sealing performance.

BRIEF SUMMARY

A drop-in fire stop assembly is provided for a concrete slab that has a passage through the slab into which the assembly is placed and fastened to the top surface of the concrete slab. A pipe may be inserted before or after the assembly is inserted. The fire stop assembly has a clam-shell configuration with first and second portions of a fire ring, split cage, split intumescent ring, split inner smoke ring and split outer smoke ring each fastened together to rotate about a hinge on the split cage to open and close. The first and second portions have free ends that spread apart to fit around the tube in an open position, and close around the tube in a closed position. A latch on the free ends of the cage hold the two portions together in the closed position. The split smoke rings may have only two free ends as they are flexible enough to open and close without completely separating the rings into two separate parts with four free ends.

Two embodiments of the drop-in fire stop assembly are disclosed. The two embodiments differ mostly on the location and support for an intumescent ring, an inner smoke ring and an outer smoke ring. The first embodiment of the summary is shown in FIGS. 6-10 and the second embodiment of the summary is shown in FIGS. 1-5.

In more detail, a first embodiment of a drop-in fire stop assembly is provided for a passage extending through a hardened concrete slab. The assembly has an assembly longitudinal axis along which a tube may extend during use. The assembly includes a fire ring having first and second fire ring portions that rotate about a rotational axis parallel to the assembly longitudinal axis between an open and closed position. The respective first and second fire ring portions each have a respective first and second free fire ring end which free fire ring ends are adjacent each other in the closed position and apart from each other in the open position. The first and second fire ring portions have respective first and second inner peripheries forming a portion of a circular opening and cooperating to define a circular fire ring opening centered on the assembly longitudinal axis when in the closed position.

The first embodiment of the fire ring assembly also advantageously has first and second retaining arms located around the respective first and second inner peripheries and extending a first distance along the assembly longitudinal axis. The first and second retaining arm ends extend inward from the respective first and second retaining arms. The fire ring also advantageously has first and second support arms located around the respective first and second inner peripheries and extending a second distance along the assembly longitudinal axis. The first and second support arm ends extend inward from the respective first and second support arms. The support arm ends and retaining arm ends do not extend inward far enough to damage or interfere with the tube or pipe in the passage or the insertion of such tube or pipe through the passage after the assembly is inserted. The first and second support arm ends are located closer to the fire ring than the first and second retaining arm ends when measured along the assembly longitudinal axis.

The assembly advantageously has a cylindrical cage that may have first and second sidewall portions connected to the respective first and second fire ring portions and extending a predetermined distance along the assembly longitudinal axis. Each sidewall portion rotates between the open and closed positions with the respective first and second fire ring portions to which the sidewall portions are connected. The first and second sidewall portions each have a respective first and second free sidewall end segment which are adjacent each other in the closed position and spaced apart from each other in the open position. The first and second sidewall portions cooperate in the closed position to encircle the assembly longitudinal axis. Each sidewall portion may include a plurality of feet extending inward from a bottom end of the sidewall portion. The first and second retaining arm ends are located intermediate the cage feet and the support arm ends when measured along the longitudinal axis. The cylindrical cage encircles and is fastened to at least one of the first and second support arms or the first and second retaining arms and thus may be fastened to both the support arms and retaining arms.

The assembly also includes a split intumescent ring that may have first and second intumescent ring portions each of which is located inside the respective first and second cage portions between the retaining arm ends and the support arm ends. The first and second intumescent ring portions each have a respective first and second intumescent ring free end which ends are spaced apart in the open position and adjacent each other in the closed position to define an intumescent ring opening centered around the assembly longitudinal axis.

In further variations of the assembly, the first and second sidewall portions may each include a plurality of sidewall segments separated from each other by a fold line aligned with the assembly longitudinal axis so the sidewall segments can bend along the fold line. Advantageously, the rotational axis of the fire ring coincides with one of the fold lines in this variation. The first and second free sidewall end segments may advantageously be fastened together to restrain separation of the first and second free sidewall end segments. The first and second sidewall portions are preferably joined together by a living hinge aligned with the assembly longitudinal axis so the sidewall portions can rotate between the open and closed positions along the living hinge.

In still further variations, the assembly may include respective first and second inner smoke ring portions located inside the respective first and second cage portions and further located between both the respective first and second retaining arm portions and the respective first and second support arm portions. The first and second inner smoke ring portions have respective first and second inner smoke ring free ends which are spaced apart from each other in the open position and adjacent to or contacting each other in the closed position. The first and second inner smoke ring portions extending inward toward the longitudinal axis.

The assembly may also include respective first and second outer smoke ring portions that are located outside the respective first and second sidewall portions and also located adjacent the fire ring. The outer smoke ring portions may have respective first and second outer smoke ring free ends which are spaced apart from each other in the open position and adjacent to or contacting each other in the closed position. The drop-in fire stop assembly may further include first and second mastic ring portions connected to respective bottom surfaces of the first and second fire ring portions and that may have respective first and second outer mastic ring free ends which are spaced apart from each other in the open position and adjacent to or contacting each other in the closed position. The mastic ring provides temporary adhesion to connect the assembly to the concrete and as it encircles the opening to the passage through it concrete surface, it provides a seal to prevent smoke from passing between the fire ring and the concrete surface. Advantageously, the assembly is placed in the hardened concrete slab with the fire ring fastened to the top surface of the concrete slab with the cage located inside the passage through the concrete slab. Appropriate means may be used to fasten the fire ring to the concrete, including adhesives, concrete nails, concrete screws and other known mechanisms.

A second version of this drop-in fire stop assembly is also provided a cylindrical passage extending along a longitudinal axis through a hardened concrete slab having opposing first and second surfaces. The fire ring is fastened to the first surface of the slab. The fire ring may include first and second fire ring portions capable of rotating about an assembly axis that is parallel to the longitudinal axis of the passage through the concrete. The first and second fire ring portions define a circular fire ring opening centered on the longitudinal axis. The first and second fire ring portions each have a free fire ring end opposite the assembly axis.

This second version of the drop-in fire stop assembly also includes a cage that may have first and second curved sidewall portions connected to the respective first and second fire ring portions and located to encircle the fire ring opening. Each first and second curved sidewall portion extends along the longitudinal axis and is hinged to rotate about the assembly longitudinal axis which extends along one of the curved sidewall portions. Each first and second curved sidewall portion may include a respective first and second free sidewall end segment which free sidewall end segments are connected to resist separation of the free sidewall end segments. Each first and second curved sidewall portion may include a respective first and second plurality of feet extending inward from a bottom end of the first and second curved sidewall portions.

This assembly also includes an intumescent ring inside of the respective first and second curved sidewall portions. The intumescent ring may include a bottom end supported in the axial direction by the first and second plurality of feet to restrain downward movement of the intumescent ring.

In further variations of this second version of the fire stop assembly, the assembly may include first and second curved sidewall portions that may have a plurality of segments separated from each other by a living hinge. These further variations may also include an intumescent ring comprising first and second intumescent ring portions each having a respective first and second intumescent ring free end which intumescent ring free ends are located at the respective first and second free sidewall end segments so the intumescent ring can rotate with the first and second sidewall portions about the assembly longitudinal axis between a closed position in which the first and second intumescent ring free ends are either adjacent each other or contacting each other, and an open position in which the first and second intumescent ring free ends are spaced apart from each other.

In still further variations, the first and second intumescent ring portions have a respective third and fourth intumescent ring free end which second and third intumescent ring free ends are located adjacent each other or contacting each other. These variations may also include an inner smoke ring that may have first and second inner smoke ring portions located inside the respective first and second cage portions and further located between the intumescent ring and the fire ring.

The variations also include a plurality of retaining arms inside of the cage and extending from the fire ring toward the intumescent ring. Each retaining arm may have an inwardly extending retaining arm end located to support the inner smoke and restrain it from axial movement toward the intumescent ring and to limit motion of the intumescent ring toward the fire ring and limit motion of the inner smoke ring. Advantageously, the cage is fastened to some of the retaining arms. These variations may also advantageously include plurality of support arms inside of the cage of the cage and extending from the fire ring toward the intumescent ring, each support arm that may have an inwardly extending support arm end located inside the passage and limiting movement of the inner smoke ring toward the fire ring.

The further variations may also include an outer smoke ring that may have first and second outer smoke ring portions outside the cage and advantageously connected to the respective first and second sidewall portions and further located at the top of the passage and adjacent the fire ring. Advantageously, at least one tube extends through the passage, the intumescent ring, the cage and the opening in the fire ring.

There is also advantageously provided a further fire stop assembly for a cylindrical passage having a longitudinal axis extending through a hardened concrete slab with the passage sized to allow a tube to pass through the passage. This further the fire stop assembly includes a cage that may have a sidewall encircling the assembly axis and that may have a living hinge rotating about a hinge axis parallel to the longitudinal axis to form first and second sidewall portions on opposing sides of a plane through the longitudinal axis and the hinge axis. Each first and second sidewall portion may include respective first and second sidewall free ends. The cage may include a first closed position where the first and second free sidewall ends are together and may include a second open position in which the first and second sidewall free ends are separated from each other a distance sufficient to allow the tube to pass between the sidewall free ends. The cage advantageously may include inwardly extending feet on a bottom of the cage.

This further assembly advantageously includes a fire ring that may have first and second fire ring portions each connected to the respective first and second sidewall portion. The first and second fire ring portions cooperate to define an opening, preferably a circular opening, encircling the longitudinal axis during use. The fire ring may include retaining arms extending along the inside of the cage and along the longitudinal axis. Retaining arm ends extend inward from a bottom end of the retaining arms. The fire ring may also have support arms extending along the inside of the cage and extending along the inside of the cage and along the longitudinal axis. The cage may be fastened to at least one of the retaining arms or support arms.

This further assembly further advantageously includes an intumescent ring that may have first and second intumescent ring portions inside the respective first and second sidewall portions and between the cage feet and the retaining arm ends. The intumescent ring may have first and second intumescent ring free ends that are together when the cage is in the closed position and separated from each other a distance sufficient to allow the tube to pass between the intumescent ring free ends when the cage is in the open position.

In variations of this further fire stop assembly, the cage sidewalls are fastened together in the closed position. The further variations may include an inner smoke ring extending inward and located inside the cage and between the support arm ends and the retaining arm ends. The further variations may also include an outer smoke ring extending outward and located on the outside of the cage at an axial location between the support arm ends and the retaining arm ends. The further variations may also include a mastic ring connected to the fire ring outside of the cage, the ring large enough to encircle the opening in the fire ring when the fire ring is in the closed position.

A second embodiment is also provided for a drop-in fire stop assembly for a cylindrical passage extending through a hardened concrete slab having a top surface into which the assembly is inserted. The fire stop assembly may include an assembly longitudinal axis. The second embodiment of the assembly may include a fire ring that may have first and second fire ring portions that rotate about a rotational axis parallel to the assembly longitudinal axis between an open and closed position. The respective first and second fire ring portions may each have a respective first and second free fire ring end which free fire ring ends are adjacent each other in the closed position and apart from each other in the open position, the first and second fire ring portions when in the closed position cooperating to define a circular fire ring opening centered on the assembly longitudinal axis.

This second embodiment of the assembly advantageously includes a cage, preferably a cylindrical cage, that may have first and second sidewall portions each encircling a portion of the opening in the respective first and second fire ring portions and extending a predetermined distance along the assembly longitudinal axis. Each sidewall portion may have at least one foot connected to the respective first and second fire ring portion and rotating between the open and closed positions with the respective first and second fire ring portions. The first and second sidewall portions may each have a respective first and second free sidewall end which free sidewall ends are adjacent each other in the closed position and spaced apart from each other in the open position. The first and second sidewall portions cooperate when in the closed position to encircle the assembly longitudinal axis. Each sidewall portion may have a plurality of intumescent ring cage arms extending inward at a bottom end of the sidewalls and around a circumference of the sidewall.

This assembly advantageously also includes first and second retainer ring portions directly fastened to at least one of the respective first and second sidewall portions or the respective first and second fire ring portions. The first and second retainer ring portions are each located a predetermined distance from the respective first and second fire ring portions measured along the assembly axis. The first and second retainer ring portions may have a respective first and second free sidewall end which free sidewall ends are adjacent each other in the closed position and spaced apart from each other in the open position.

This assembly advantageously includes a split intumescent ring having first and second intumescent ring portions each connected to and located inward of the respective first and second sidewall portions and rotating between the open and closed positions with the respective sidewall portions. The first and second intumescent ring portions each have a respective first and second intumescent ring free end which intumescent ring free ends are spaced apart in the open position and adjacent each other in the closed position to define an intumescent ring opening centered around the assembly longitudinal axis. The first and second intumescent ring portions may each have corresponding first and second distal axial ends that extend a first distance beyond distal axial ends of the corresponding first and second sidewalls when measured along the assembly longitudinal axis. At least one of the plurality of cage arms extends a through the intumescent ring a distance sufficient to support the weight of the intumescent ring when installed in the passage.

In further variations of this second embodiment of the assembly, the first and second intumescent ring portions may each have a length L measured along the assembly longitudinal axis and the first distance is between 0.2L and 2L. In another variation, the first and second sidewall portions each comprise a plurality of sidewall segments separated from each other by a fold line aligned with the assembly longitudinal axis so the sidewall segments can bend along the fold line, with the rotational axis of the fire ring coinciding with one of the fold lines. Advantageously, the first and second free sidewall ends are fastened together to restrain separation of the first and second free sidewall ends. Moreover, the first and second sidewall portions may each comprise a plurality of segments, with adjacent segments separated from each other by a living hinge aligned with the assembly longitudinal axis so the segments can bend along the living hinge. In still further variations of the second embodiment, the first distance is 0.5 inches to 1.5 inches and each first and second fire ring portion may include respective first and second portions of a flange extending inward of and along an axial length of the respective first and second sidewall portions.

The second embodiment of the assembly may also include respective first and second inner smoke ring portions located between the respective first and second retainer portions and extending inward toward the assembly longitudinal axis. The first and second inner smoke ring portions may have respective first and second inner smoke ring free ends which are spaced apart from each other in the open position and adjacent to or contacting each other in the closed position. Additionally, this assembly may include respective first and second outer smoke ring portions extending outward from the respective first and second sidewall portions adjacent the fire stop, and may also have respective first and second outer smoke ring free ends which are spaced apart from each other in the open position and adjacent to or contacting each other in the closed position. Further, the assembly may also include respective first and second mastic ring portions connected to respective bottom surfaces of the first and second fire ring portions as well as respective first and second outer mastic ring free ends which are spaced apart from each other in the open position and adjacent to or contacting each other in the closed position.

Another version of the second embodiment of the fire stop assembly may include the cylindrical passage extending along a longitudinal axis through a hardened concrete slab having opposing first and second surfaces. This version may also include a fire ring fastened to the first surface. The fire ring may have first and second fire ring portions capable of rotating about an assembly axis that is parallel to the longitudinal axis. The first and second fire ring portions may each have a free fire ring end opposite the assembly axis. The first and second fire ring portions advantageously define a circular fire ring opening centered on the longitudinal axis.

This version may also include a cage advantageously having first and second curved sidewall portions connected to the respective first and second fire ring portions and located to encircle the fire ring opening. Each first and second curved sidewall portion is advantageously hinged to rotate about the assembly longitudinal axis which is located on and extends along one of the curved sidewall portions. Each first and second curved sidewall portion may have a respective first and second free sidewall end which free sidewall ends are connected to resist separation of the free sidewall ends. Each first and second curved sidewall portion may have respective first and second cage arms extending inward.

This version may also include first and second retainer ring portions directly fastened to at least one of the respective first and second sidewall portions or the respective first and second fire ring portions. The first and second retainer ring portions are each located a predetermined distance from the respective first and second fire ring portions measured along the assembly axis.

This version may also include an intumescent ring having first and second intumescent ring portions located in the intumescent ring support below the respective first and second retainer ring portions and on an inside of the respective first and second curved sidewall portions. Each first and second intumescent ring portion may have a respective first and second intumescent ring free end. The intumescent ring free ends are located at the respective first and second free sidewall ends. The first and second intumescent ring free ends have a first closed position adjacent each other or contacting each other. The first and second intumescent ring portions may each have corresponding first and second bottom ends that extend a first distance beyond distal axial ends of the corresponding first and second sidewalls and toward the second surface when measured along the assembly longitudinal axis. The first and second cage arms advantageously pass through the body of the respective first and second intumescent ring portions.

In further variations of this second version of the fire stop assembly, the first and second curved sidewall portions comprise a plurality of segments separated from each other by a living hinge. Further, the first and second intumescent ring portions may have a respective third and fourth intumescent ring free end which second and third intumescent ring free ends are located adjacent each other or contacting each other in both the open and closed positions. The variations may also include an inner smoke ring that may have first and second inner smoke ring portions connected to the respective first and second fire ring portions and extending inward. Each first and second inner smoke ring portion may have a respective first and second inner smoke ring free end which inner smoke ring free ends are adjacent to or contacting each other in both the open and closed position. The first and second inner smoke ring portions interposed between respective first and second fire ring portions and first and second retainer ring portions. Further variations include an outer smoke ring that may have first and second outer smoke ring portions connected to the respective first and second sidewall portions with a top portion of the outer smoke ring located along the longitudinal assembly axis at the respective first and second fire ring portions. Advantageously, at least one tube extends through the passage, the intumescent ring, the cage, the retainer ring and the opening in the fire ring.

A still further version of this second embodiment of the fire stop assembly is provided for a cylindrical passage extending through a hardened concrete slab having an assembly longitudinal axis with the passage sized to allow a tube to pass through the passage. This still further version includes a cage having a sidewall encircling the assembly axis and having a living hinge rotating about a hinge axis generally parallel to the assembly axis to form first and second sidewall portions on opposing sides of the hinge axis. Each first and second sidewall portion may have respective first and second sidewall free ends. The cage may have a closed position where the first and second free sidewall ends are together and may also have a second position in which the first and second sidewall free ends are separated from each other a distance sufficient to allow the tube to pass between the sidewall free ends. The cage may have inwardly extending cage arms.

This version may include a fire ring having first and second fire ring portions each connected to a top of respective first and second sidewall portions. The first and second fire ring portions cooperate to encircle a circular opening. The version may also include first and second retainer ring portions fastened to the respective first and second sidewall portions a predetermined distance from the respective first and second fire ring portions measured along the assembly axis and encircling the assembly longitudinal axis. This version may also include an intumescent ring having first and second intumescent ring portions inside the sidewall and below the respective first and second retainer ring portions. The first and second intumescent ring portions may have a length along the longitudinal assembly axis which extends below a respective bottom end of the first and second sidewall portions. The first and second intumescent ring free ends are preferably together when the cage is in the closed position and separated from each other a distance sufficient to allow the tube to pass between the intumescent ring free ends when the cage is in the open position.

In further variations of this still further version of the fire stop assembly, the cage sidewalls are fastened together in the closed position. Moreover, the assembly may include an inner smoke ring extending inward and located between the fire ring and the retainer ring. An outer smoke ring may also be provided, extending outward from the cage and located at the fire ring. Additionally, the assembly may include a mastic ring interposed between the outer smoke ring and the fire ring and sized to encircle the cage and to contact the top surface of the concrete when the assembly is fastened to the concrete surface.

BRIEF DESCRIPTION OF THE DRAWINGS

These and other advantages and features of the invention will be better appreciated in view of the following drawings and descriptions in which like numbers refer to like parts throughout, and in which.

DETAILED DESCRIPTION

Figure 1A:
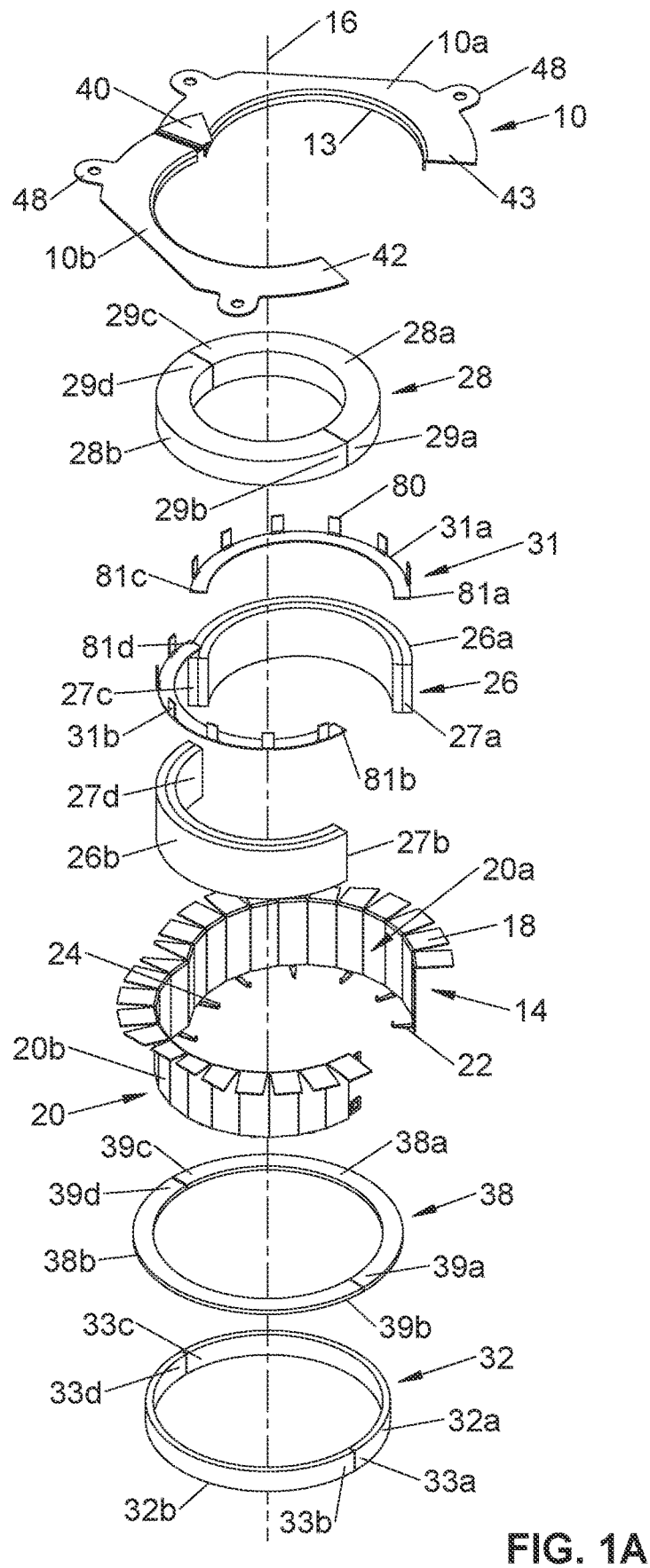
FIG. 1A is an exploded perspective view of a drop-in fire stop assembly for a concrete floor with most of the parts in an open position.

As used herein, the following part numbers refer to the following parts for FIGS. 1-5, throughout: 10—fire ring; 10a,b—first and second fire ring portions; 12—opening in fire ring; 13— flange; 14— cage; 16—assembly longitudinal axis; 18—cage feet; 20—cage sidewall; 20a, b—first and second sidewall portions; 22—cage arms; 24 —distal inner ends of cage arms; 26—intumescent ring; 26a—first portion of intumescent ring; 26b-second portion of the intumescent ring 26; 27a,c—opposing ends of portion 26a; 27b,d—opposing ends of portion 26b; 28—inner smoke ring; 28a—first portion of inner smoke ring 28; 28b—second portion of inner smoke ring 28; 29a,c—opposing ends of portion 28a; 29b,d—opposing ends of portion 28b; 30— tube; 31—retainer ring; 31a,b—first and second portions of retainer ring 31; 32—outer smoke ring; 32a—first portion of outer smoke ring 32; 32b—second portion of outer smoke ring 32; 33a,c—opposing ends of portion 32a; 33b,d—opposing ends of portion 32b; 34—passage through concrete; 36—concrete floor; 36a,b—top and bottom floor surfaces; 38—mastic ring; 38a,b—first and second portions of mastic ring 38; 39a,c—opposing ends of portion 38a; 39b,d—opposing ends of portion 38b; 40—first offset end of the second fire ring portion 10b; 41—first end of the first fire ring portion 10a; 42—second end of the second fire ring portion 10b; 43—second end of the first fire ring portion 10a; 44—fastener openings; 48—mounting tab; 49—fold line; 49a-hinge line; 50—first end segment; 52—second end segment; 54—first latch segment; 56—second latch segment; 58a,b—inclined edges; 80—leg of the retainer ring 31; 81a,b—first and second ends of retainer ring 31; and 81b,c—third and fourth ends of retainer ring 31.

As used herein, the following part numbers refer to the following parts for FIGS. 6-10: 112—opening in fire ring 210; 116—assembly longitudinal axis; 126—intumescent ring; 126a—first intumescent ring portion; 126b—second intumescent ring portion; 127a,c—opposing ends of portion 126a; 127b,d—opposing ends of portion 126b; 128—inner smoke ring; 128a—first inner smoke ring portion; 128b—second inner smoke ring portion; 129a,c—opposing ends of portion 128a; 129b,d—opposing ends of portion 128b; 130— tube; 132—outer smoke ring; 132a—first outer smoke ring portion; 132b—second outer smoke ring portion; 133a,c—opposing ends of portion 132a; 133b,d—opposing ends of portion 132b; 134—passage through concrete; 136—concrete floor; 36a,b—top and bottom floor surfaces; 138—mastic ring; 138a,b—first and second portions of mastic ring 138; 139a,c—opposing ends of portion 38a; 139b,d—opposing ends of portion 38b; 144—fastener openings; 148—mounting tab; 149—fold line; 149a—hinge line; 150—first end segment; 152—second end segment; 154—first latch segment; 156—second latch segment; 202a,b—support arms; 204a,b—ends of support arms 202a,b; 206a,b—retaining arms; 208a,b—ends of retaining arm 206a,b; 210— fire ring; 210a,b—fire ring portions; 211a,b,c,d—ends of fire ring portions 210a,b; 214— cage; 214a,b—cage portions; 218—cage feet; and 220—cage sidewall;

As used herein, the relative directions inner and outer, inside and outside, are with respect to a longitudinal axis of the fire stop assembly which usually coincides with a longitudinal axis of a passage through a concrete slab when installed, with inward directions or positions being toward or closer to that axis and outward directions or positions being away from or further from that axis. The lateral direction is generally perpendicular to the assembly longitudinal axis. The relative directions above and below, up and down, top and bottom, are with respect to the assembly longitudinal axis when the drop-in assembly is suspended from the top surface of a floor and hangs downward in the installed position. That longitudinal axis will usually be vertical for the floors in a building, and that the axis will likely be horizontal if the concrete forms a wall of a building. As used herein, references to lengths measured along an axis include measurements along axes parallel to the specified axis, references to extending along an axis include extending along axes parallel to the specified axis, and references to rotation about an axis include rotation about axes parallel to the specified axis.

Figure 1B:
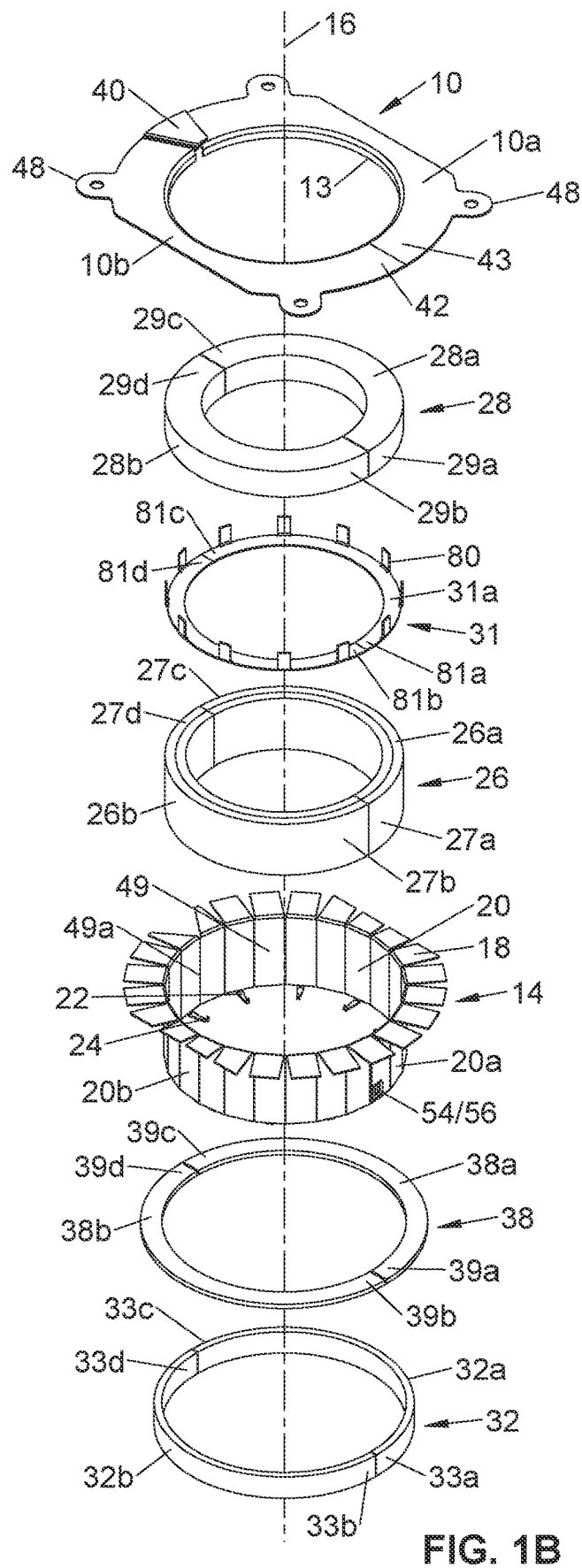
FIG. 1B is an exploded perspective view of a drop-in fire stop assembly of FIG. 1 with the parts in a closed position.

Referring to FIGS. 1-5, but primarily to FIGS. 1A-1B, a drop-in fire stop assembly is described. A fire ring 10 has a circular opening 12 advantageously encircled by stiffening flange 13 which extends downward. A cage 14 is connected to the fire ring 10 so as to encircle the opening 12 and the flange 13, with the cage 14 extending along a assembly longitudinal axis 16 through the center of the opening 12. The assembly longitudinal axis 16 corresponds to a longitudinal axis of a passage through the concrete as described later. The cage 14 has a plurality of cage feet 18 extending outward from a top of a cage sidewall 20 of the cage 14 and has a plurality of cage arms 22 extending inward from a bottom end of the cage sidewall 20 in a direction toward the assembly longitudinal axis 16. The cage arms 22 are located around a circumference of the cage sidewall 20.

Advantageously, the cage arms 22 each have a larger circumferential width at the sidewall 22 and a smaller width at the inward end of the cage arms 22, with distal inner ends 24 of the cage arms 22 oriented upward along the assembly longitudinal axis 16. The circumferential width is much smaller than the circumferential width between adjacent fold lines 49 and are preferably about 0.1 to 0.3 inches wide at the cage sidewall 20 and tapering linearly to a circumferential width of about 0.1 inch or smaller. The distal inner ends 24 are advantageously short in length, preferably 0.05 to 0.2 inches in length and taper to a point. The distal inner ends 24 extend inward a distance greater than the thickness of an intumescent ring 26 so the length of each arm 22 is greater than the radial thickness of the intumescent ring 26. The cage arms 22 and distal inner ends 24 pierce the thickness of the intumescent ring 26 with the distal inner ends 24 preferably extending slightly inward beyond the inner surface of the intumescent ring 26. The arms 22 center the intumescent ring 26 and support the weight of the intumescent ring 26 in installed position where the retainer 31 is above the intumescent ring 26. When the cage 14 is oriented upward, above the fire ring 10, a retainer ring 31 may support some of the weight of the intumescent ring 26. The distal inner ends 24 prevent the intumescent ring 26 from moving in the lateral plane. The distal inner ends 24 are not long enough to contact a tube 30 when installed and the distal inner ends 24 reduce harm to any inadvertent contact with those ends.

An inner smoke ring 28 is configured to encircle a tube 30 (FIGS. 5A-5B) passing through the intumescent ring 26 and opening 12 so the inner smoke ring is interposed between the inside of the intumescent ring 26 and the tube 30. The inner smoke ring 28 may be referred to as a pipe smoke ring when the smoke ring encircles a pipe. The inner smoke ring 28 is interposed between the fire ring 10 and the retainer ring 31 extending toward the assembly longitudinal axis 16 having legs 80 located around an outer periphery of the retainer ring 31 and extending along the assembly longitudinal axis 16. The retainer ring 31 or the legs 80 are fastened to the cage sidewalls 20 or the end of the legs are fastened to the fire ring 10, to locate or space the retainer ring 31 a predetermined distance from the fire ring 10 along the assembly longitudinal axis 16. Spot welding or adhesives are believed suitable for the connection. The intumescent ring 26 is located between the retainer ring 31 and the cage arms 22. Thus, the retainer ring 31 limits axial expansion of the intumescent ring 26 in the direction of the retainer ring 31.

Figure 4A:
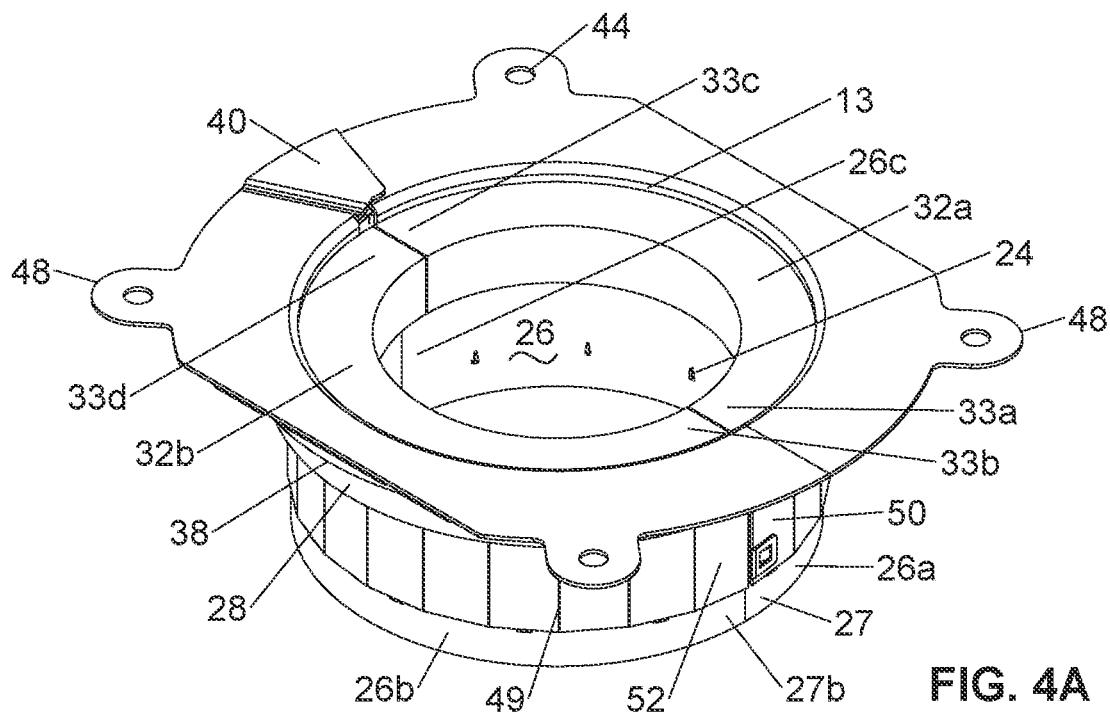
FIG. 4A is a top perspective view of the drop-in fire stop assembly of FIG. 1A, in a closed position.
Figure 4B:
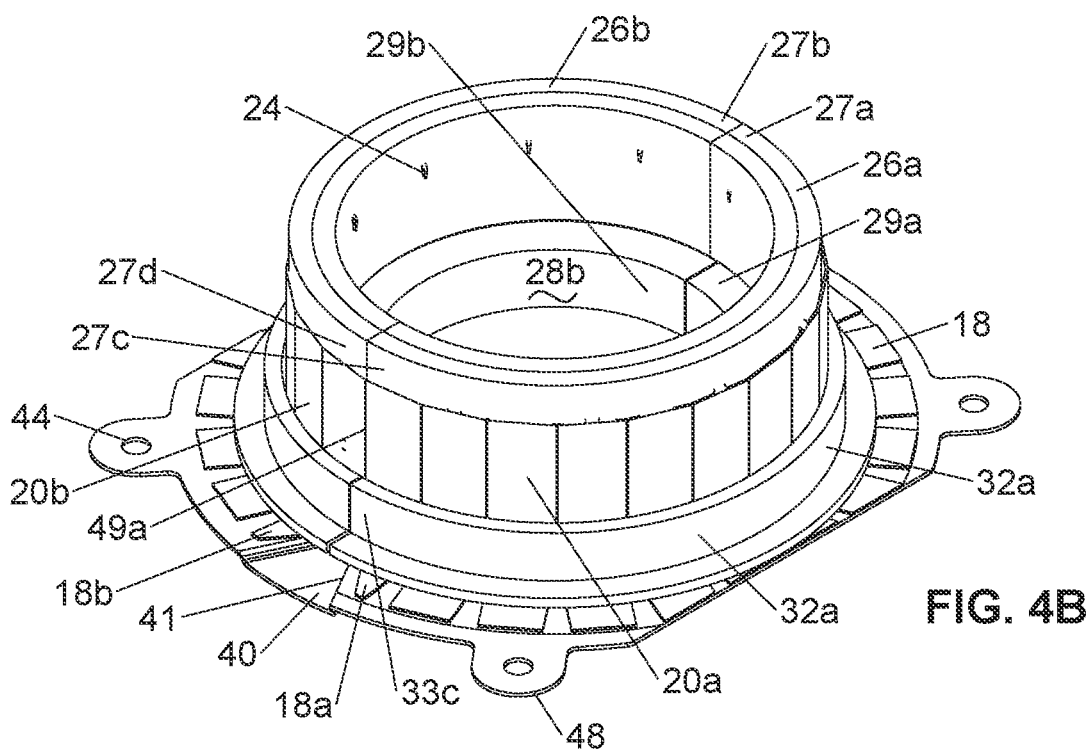
FIG. 4B is a perspective view of the drop-in fire stop assembly of FIG. 4A in a closed position but rotated 180 degrees to face upward.
Figure 5A:
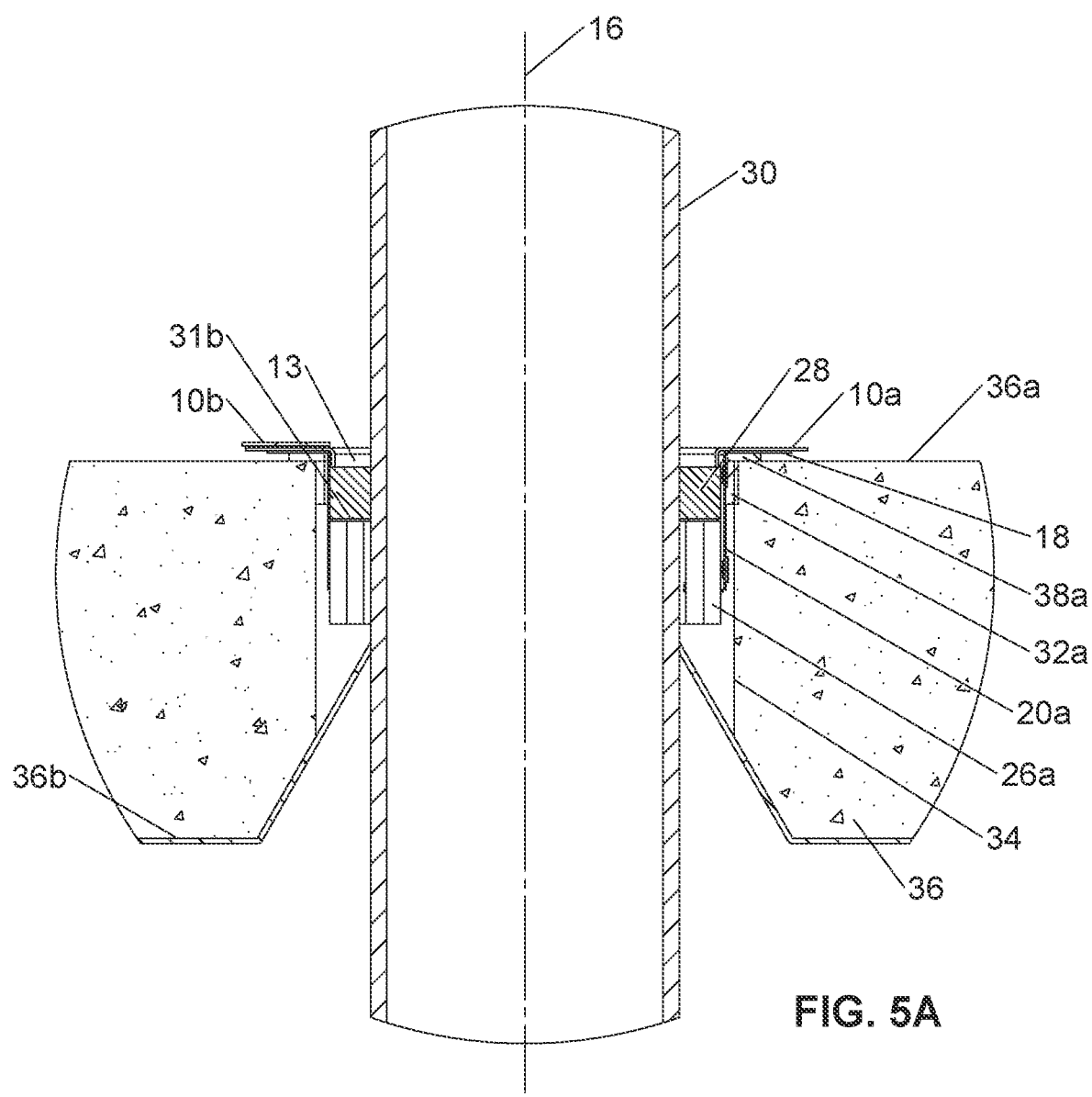
FIG. 5A is a cross sectional view of the drop-in fire stop assembly of FIG. 4A installed a passage containing a tube passing through the assembly.
Figure 5B:
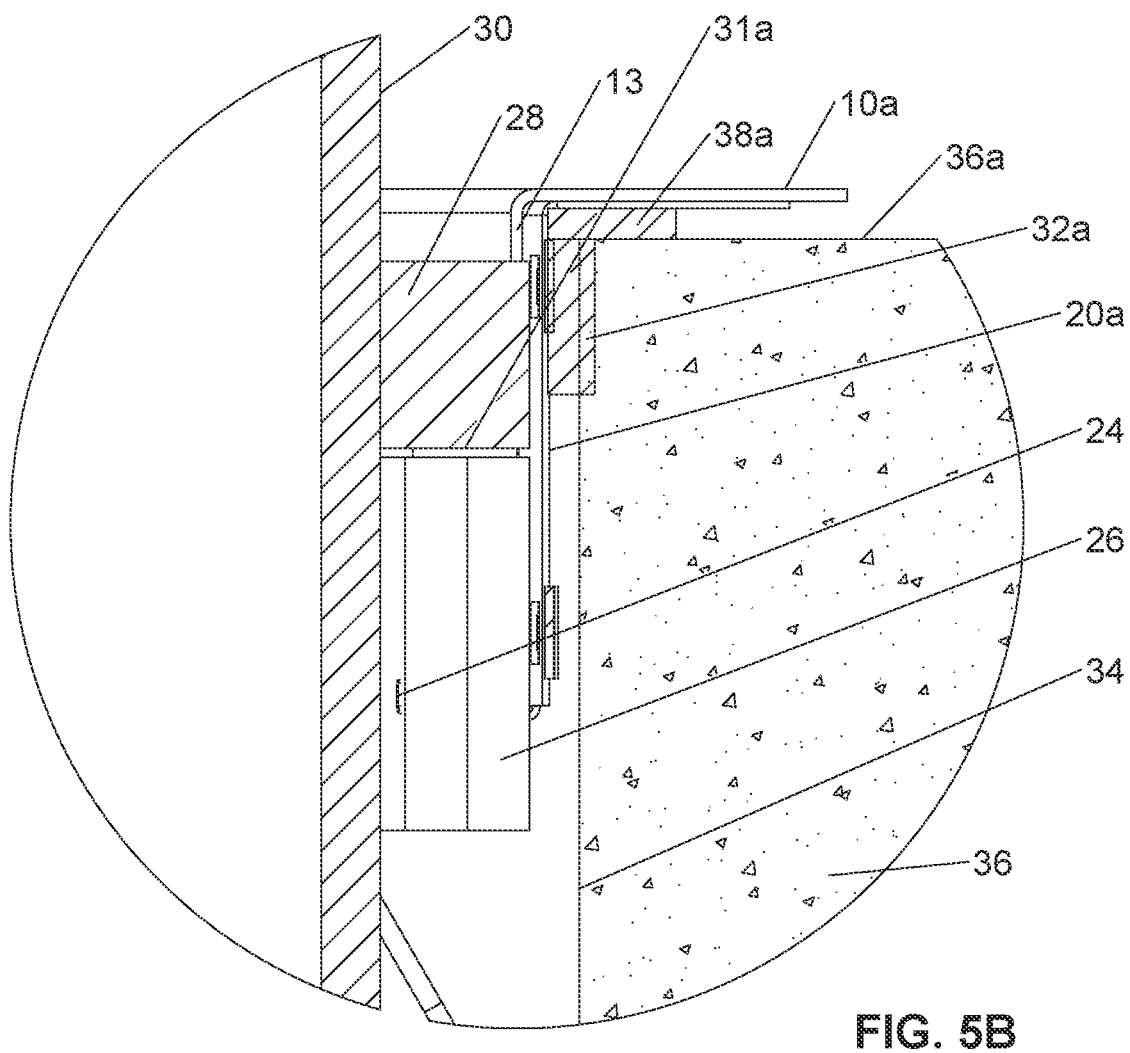
FIG. 5B is an enlarged portion of the cross sectional view of FIG. 5A.

A outer smoke ring 32 is configured to encircle the outside of the sidewall 20 of the cage 14 and be interposed between the cage 14 and the wall forming a passage 34 (FIGS. 5A-5B) that extends through a concrete wall or floor 36 having a top floor surface 36a and a bottom floor surface 36b. It is understood that while the embodiments depicted in the figures are in the context of a concrete floor 36, the invention is applicable to any hardened concrete slab. The outer smoke ring 32 may be referred to as a cage smoke ring because it extends between the outer side of cage 14 and the sidewalls 20, and the passage 34 to form an outer seal with passage 34 during use. As seen in FIGS. 4B, 5A and 5B, the cage smoke ring or outer smoke ring 32 extends around the top of the cage 14 adjacent the cage feet 18 and fire ring 10.

Advantageously, an optional mastic ring 38 is located between the cage feet 18 and/or the fire ring 10, and the top floor surface 36a, to adhere the outer smoke ring 32 to the concrete floor 36 and to provide a moisture barrier between that concrete surface and the drop-in assembly. The mastic ring 38 is advantageously located outside of the outer smoke ring 32 and has one surface stuck to the concrete-facing surface of the fire ring 10. Thus, the mastic ring 38 is preferably large enough to encircle the outer smoke ring 32 and is positioned to do so when the fire stop assembly is installed. The mastic ring 38 may be omitted and other mechanisms used to place an adhesive, sealing layer between the fire ring 10 and the top floor surface 36, including adhesives, caulk or other sealants. The mastic ring 38 with adhesives on both sides is believed suitable, especially if each adhesive side has a pull-off protective layer that may be removed shortly before use of the mastic ring 38 to expose underlying adhesive surface on the mastic ring 38. A silicon washer may also be used in place of the mastic ring 38, with adhesives or mechanical fasteners holding the silicon washer in position during installation.

Referring to FIGS. 1A-1B, the rings 26, 28, 31, 32 and 38, are preferably split rings to allow them to open and close in a clam-shell manner with first and second fire ring portions 10a, 10b. Thus, the intumescent ring 26 advantageously forms a split ring with at least one split forming adjacent first and second ends 27a, b. The intumescent ring 26 advantageously forms two halves, first and second portions 26a, 26b, with the first portion 26a having opposing free ends 27a, 27c and with the second portion 26b having opposing free ends 27b, 27d if separated. The free ends 27a, 27b are also referred to as the first and second intumescent ring portion free ends 27a, 27b. These free ends 27a,b move toward and away from each other as discussed herein. The free ends 27c, 27d usually remain adjacent to each other even in the open position and may be omitted if the intumescent ring 26 is sufficiently flexible that it can rotate along the rotational axis between the open and closed positions and not physically separate into two separate parts.

Similarly, the inner smoke ring 28 advantageously forms a split ring with at least one split forming adjacent first and second ends 29a,b. The inner smoke ring 28 advantageously forms two halves, first and second portions 28a,b, with the first portion 28a having opposing free ends 29a,c with the second portion 28b having opposing free ends 29b,d if separated. The free ends 29a,b are also referred to as first and second inner smoke ring free ends 29a, 29b. These free ends 29a, 29b move toward and away from each other as discussed herein. The free ends 29c, 29d usually remain adjacent to each other and may be omitted if the inner smoke ring 28 is sufficiently flexible that it can rotate along the rotational axis between the open and closed positions and not physically separate into two separate parts.

Further, the retainer ring 31 advantageously forms a split retainer ring with at least one split forming adjacent first and second ends 81a,b. The retainer ring 31 advantageously forms two halves, first and second portions 31a,b, with the first portion 31a having opposing free ends 81a,c and with the second portion 81b having opposing free ends 81b, 81d if separated. These free ends 81a,b are also referred to as first and second retainer ring free ends 81a, 81b. These free ends 81a,b move toward and away from each other as discussed herein. The free ends 81c, 81d usually remain adjacent to each other if they are located on the hinge line.

Further, outer smoke ring 32 advantageously forms a split outer smoke ring with at least one split forming adjacent first and second ends 33a, b. The outer smoke ring 32 advantageously forms two halves, first and second portions 32a, 32b, with the first portion 32a having opposing free ends 33a, c and with the second portion 32b having opposing free ends 33b,d. These free ends 33a,b also referred to as first and second outer smoke ring ends 33a,b. These free ends 33a,b move toward and away from each other as discussed herein. The free ends 33c, 33d usually remain adjacent to each other and may be omitted if the outer smoke ring 32 is sufficiently flexible that it can rotate along the rotational axis between the open and closed positions and not physically separate into two separate parts.

Also, when present, the mastic ring 38 advantageously forms a split mastic ring with at least one split forming adjacent first and second ends 39a,b. The mastic ring 38 advantageously forms two halves, the first and second portions 38a, 38b, with the first portion 38a having opposing free ends 39a,c and with the second portion 38b having opposing free ends 39c,d. These free ends 39a,b are also referred to as first and second mastic ring free ends 39a,b. These free ends 39a,b move toward and away from each other as discussed herein. The free ends 39c, 39d usually remain adjacent to each other and may be omitted because the mastic ring 38 is usually sufficiently flexible that it can rotate along the rotational axis between the open and closed positions and not physically separate into two separate parts.

As used in the context of the intumescent ring 26, the inner smoke ring 28, the retainer ring 31, the outer smoke ring 32 and the mastic ring 38, the term "adjacent" is used to encompass contacting parts or parts that are very close together as at the free ends 27c, 27d, 29c, 29d, 33c, 33d, 39c, 39d, 81c and 81d is also intended to encompass any physical separation of the free ends 27a, 27b, 29a and 29b, 33a, 33b, 39a, 39b, 81a and 81b which occur when the two segments of the hinged assembly are in both the open position and the closed position. The open position is large enough to allow the tube 30 to pass between the adjacent free ends of the intumescent ring 26, the inner smoke ring 28 and the outer smoke ring 32, and preferably not more than 20 to 40% larger than the tube diameter in order to reduce separation of the free ends 27a, 27b, 29a and 29b, 33a, 33b, 39a, 39b, 81a and 81b in the open position.

The intumescent ring 26, the inner smoke ring 28, the retainer ring 31, the outer smoke ring 32 and the mastic ring 38 may also have only one slit forming the first and second adjacent ends 27a, 27b, the first and second ends 29a, 29b, the first and second ends 33a, 33b, the first and second ends 39a, 39b, and the first and second ends 81a, 81b, respectively, with ends 27c, 27d, 29c, 29d, 33c, 33d, 39c, 39d, 81c and 81d, respectively, not being physically slit and separated and instead representing ends of portions of the intumescent ring 26, the inner smoke ring 28, the retainer ring 31, the outer smoke ring 32 and the mastic ring 38 on opposing sides of the hinge about which the assembly opens and closes. The advantage of having only one slit and one pair of adjacent ends is that it allows the portion of the respective ring diametrically opposite the slit, to act as a living hinge without requiring a physical separation. In some many cases that can reduce the number of parts, result in simpler manufacturing and assembly, reduce costs, and result in a stronger and more stable ring. There is thus advantageously only one slit in each ring 26, 28, 31, 32 and optional ring 38 which slit is located in the plane along the assembly longitudinal axis 16 and through the location where the first and second end segments 50, 52 contact each other, as described later.

The cage 14 forms a hinge parallel to the assembly longitudinal axis 16, and the cage 14 is connected to the fire ring 10 and the retainer ring 31 to so the cage 14, the retainer ring 31, intumescent ring 26, the inner smoke ring 28, the mastic ring 38 and the fire ring 10 have a first open position allowing a tube 30 parallel to the assembly longitudinal axis 16 to move laterally through an opening between mating but spatially separated parts of the fire ring 10 and the cage 14. The cage 14, the retainer ring 31, the intumescent ring 26, the inner smoke ring 28, the mastic ring 38 and the fire ring 10 have a second, closed position where the mating parts are joined to encircle and enclose the elongated tube 30 when the tube's longitudinal axis is coincident with the assembly longitudinal axis 16. The fire ring 10 and the cage 14 and its cage sidewall 20 and the retainer ring 31 can thus rotate open and closed about an axis parallel to the assembly longitudinal axis 16 in a clamshell manner so they can fit around a preinstalled tube 30.

Similarly, the intumescent ring 26 has a first open position with ends 27a, 27b separated, and a second, closed position with ends 27a, 27b adjacent each other and preferably directly contacting each other. Likewise, the inner smoke ring 28 has a first open position with ends 29a, 29b separated, and a second, closed position with ends 29a, 29b adjacent each other and preferably directly contacting each other. Also, the outer intumescent ring 32 has a first open position with ends 33a, 33b separated, and a second, closed position with ends 33a, 33b adjacent each other and preferably directly contacting each other.

The fire ring 10 and cage 14 are preferably formed of metal, such as corrosion resistant steel, galvanized metal or metal coated to resist corrosion. The cage 14 is fastened to the fire ring 10 so the cage 14 forms a hinge which allows the fire ring 10 to be formed of two separate parts that move relative to each other and rotate about an axis parallel to the assembly longitudinal axis 16 with the cage 14. This motion allows the one side of the fire ring 10 and the cage 14 to separate enough so the pipe or tube 30 can fit through the separated parts and allow the cage 14 and the fire ring 10 to be retrofit to pre-installed pipes or tubes. This construction is explained in more detail later, but preferably has at least one portion of the fire ring portions overlapping each other during rotation.

Figure 2A:
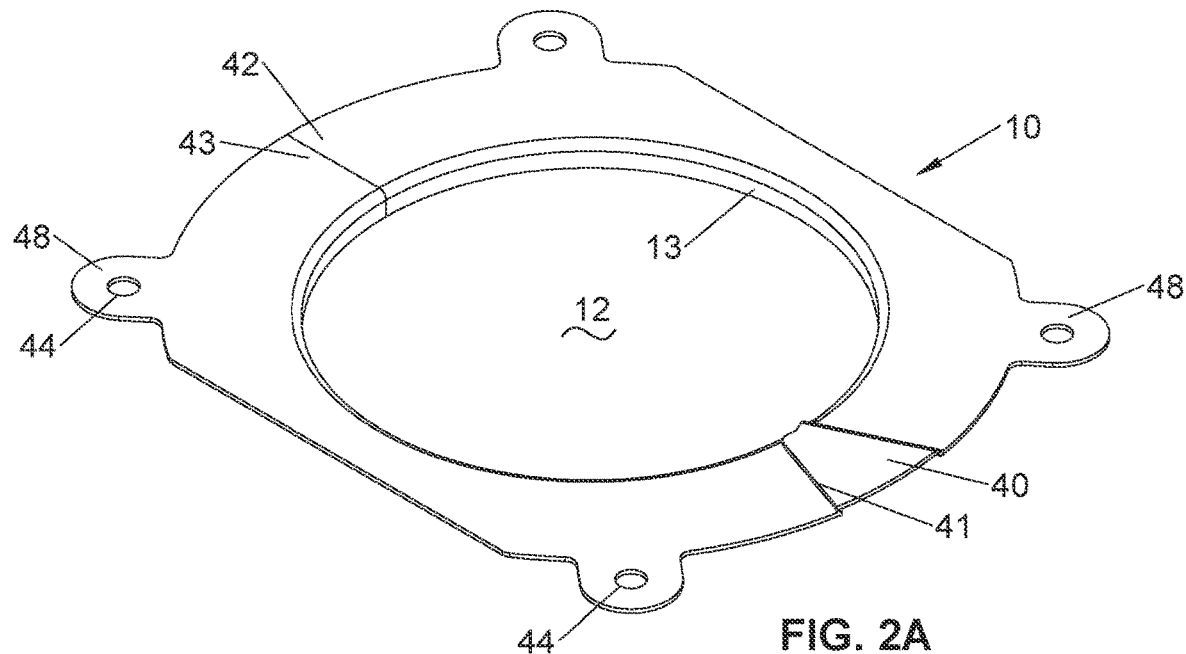
FIG. 2A is top perspective view of a fire ring of FIG. 1B in a closed position.
Figure 2B:
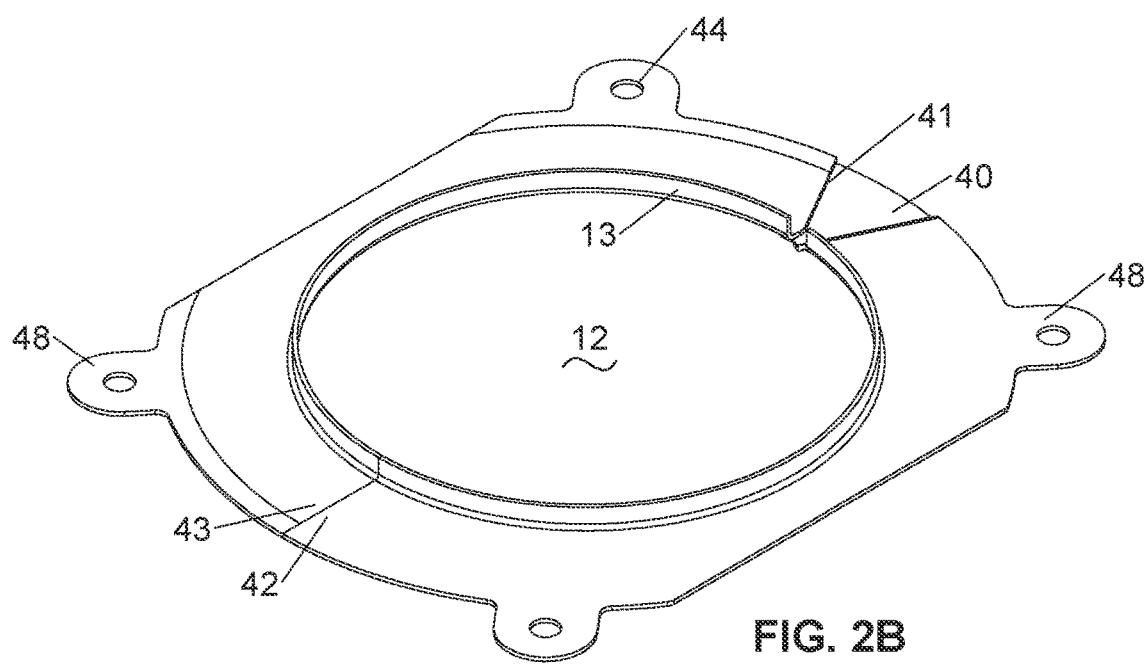
FIG. 2B is a perspective view of the fire ring of FIG. 2A in a closed position but rotated 180 degrees to face upward.

Referring to FIGS. 1-2, the fire ring 10 is advantageously a generally flat plate with the circular opening 12. It may also be referred to as a support plate. As used herein, the depicted fire ring 10 is considered generally flat even though it has a stiffening flange 13 depending downward around the circular opening 12 and has offset portions at the split lines of the fire ring 10, because the majority of the area of the fire ring 10 and its first and second fire ring portions 10a,b are a flat sheet of material, preferably metal. Each first and second fire ring portion 10a,b advantageously has at least one, and preferable two or three mounting tabs 48 with fastener holes through those mounting tabs 48. The mounting tabs 48 are formed at the corners of a generally square fire ring 10.

As best seen in FIGS. 1-2, the fire ring 10 is advantageously split at its middle to form first and second fire ring portions 10a,b. The first and second fire ring portions 10a,b each have a recess defining a portion of the opening 12. The opening 12 is preferably circular and slightly larger than the diameter of tube 30, so the recesses are semi-circular, each about half a circle or more. Each of the first and second fire ring portions 10a,b has a flange 13 encircling the respective portion of the circular opening 12. First and second ends 40, 42 are on opposing ends of the semi-circular recess of the first fire ring portion 10a. Second fire ring ends 41, 43 are on opposing ends of the semi-circular recess on the second fire ring portion 10b. The first end 40 is also referred to an overlapping end portion 40.

The first end 40 is offset axially from the plane of the first fire ring portion 10a and overlapping end 41 so the ends 40, 41 nest together and slide over one another as the first and second fire ring portions 10a,b rotate open and closed in a clamshell motion described later. Advantageously, the amount of the offset of the first end 40 is about the thickness of the second fire ring portions 10b, so the first and second fire ring portions 10a,b are in the same plane to avoid tilting of the assembly longitudinal axis 16 when the fire ring 10 rests against the top floor surface 36a of concrete floor 36. The overlap is preferably in a triangular shaped area arising from rotation about an axis in the cage 14 described later. The ends 40, 41 preferably are not separated in the open position and instead slide over one another. The ends 42, 43 preferably separate in the open position and contact each other in the closed position. The flange 13 around opening 12 prevents the ends 42, 43 from easily sliding over one another so the ends 42, 43 contact each other in the closed position and advantageously do not overlap.

Advantageously, a plurality of fastener openings 44 are formed in each of the first and second fire ring portions 10a,b so the fire ring 10 can be fastened to the top floor surface 36a of the concrete floor 36 by fasteners such as concrete nails. Preferably, a fastener opening 44 is formed in each mounting tab 48. When installed, the side of the fire ring 10 facing the top floor surface 36a is preferably the flattest side so as to present a greater contact area with the concrete floor 36, and to present a fire ring better aligned with the top floor surface 36a of the concrete floor 36 so as to keep the fire stop assembly centered along the assembly longitudinal axis 16.

The cage 14 is preferably formed of a sheet of rectangular metal with a top and sides and the material extending therebetween is scored, stamped or rolled along the longitudinal assembly axis at periodic distances corresponding to the width of the cage feet 18 so as to form fold lines 49. When assembled, the fold lines are generally parallel to the assembly axis 16 and may function as a living hinge allowing the adjacent segments of the cage to bend along the length of the fold line and encircle the axis 16. The fold lines 49 may be on one or both sides of the sheet and are cut, rolled or stamped to form generally rectangular segments. A bottom portion of each rectangle is cut or otherwise shaped to form cage arm 22 which is bent perpendicular to the sheet of metal to form the cage arms 22, and the distal end 24 of each arm is bent again so the distal ends are parallel to the metal sheet and form the distal inner ends 24 of the cage arms 22. The cage arms 22 have a width sufficient to support the weight of the intumescent ring 26. The cage arms 22 are preferably not the full width of the rectangular segment between adjacent fold lines 49 so as not to retard the free flow of smoke and passage of heat during a fire.

The metal between the fold lines at the bottom of the sidewall is bent outward to form cage feet 18. When the rectangular sheet of rectangles formed by fold lines 49 is bent into a curved shape around assembly longitudinal axis 16 to form a curved cage sidewall 20, the cage feet 18 will splay apart, forming a triangular shaped gap between the facing edges of adjacent cage feet 18 with the gap larger at the distal inner ends 24 of the cage feet 18 and smaller near the cage sidewall 20. The sequence of the above steps to form the basic shape of the cage 14 can vary.

The length of the metal strip needed to form the cage 14 will vary and is selected to correspond with the diameter of the passage 34 through the concrete floor 36 with the cage diameter slightly smaller than the passage diameter. As most passages 34 are cut to form cylindrical tubes, the metal strip is oriented so the fold lines 49 align with the assembly longitudinal axis 16 and the strip is then bent at the fold lines to form a cylinder with the cage arms 22 extending toward the assembly longitudinal axis 18 and the distal ends 24 extending parallel to that axis. The cage feet 18 are preferably bent to extend radially outward from the axis 18 and parallel to the cage arms 20. The cage sidewall 20 between each pair of adjacent fold lines 49 forms a rectangular segment, with the plurality of segments forming a polygon that when assembled approximates a circular sidewall when the sidewall is bent around the assembly longitudinal axis 16 to form a circle for insertion into passage 34. The two opposing ends of the cage sidewall 20 are defined by first and second end segments 50, 52 and may move toward and away from each other.

The end 27a of intumescent ring 26a is advantageously flush with the distal end or circumferential end of first end segment 50, and the end 27b of intumescent ring 26b is advantageously flush with the distal end or circumferential end of the second end segment 52, so that as end segments 50, 52 approach and preferably contact each other, the circumferential ends 27a, 27b preferably approach and contact each other.

Mating first and second latch portions 54, 56 are formed on different ones of the end segments 50, 52 and positioned on those end segments so the mating latch portions can engage each other to hold the end segments of the cage sidewall 20 together and form a circular cage around the fire ring opening 12. The latch portions 54, 56 are advantageously male and female latch segments (e.g., male projection or tang engaging a mating hole or edge; hook and loop/catch). The depicted latch portions shown in FIG. 3B include the first latch portion 54 in a male configuration extending inward from a tab which extends in a circumferential direction from the free end of first end segment 50. The second latch portion 56 is in a female configuration and comprises a rectangular opening in the first end segment 52 of the cage sidewall 20. The first portion 54 extends inward from the first end segment 52 and is configured to engage the opening of second latch portion 56 to connect the latch portions and hold the end segments 50, 52 together. Thus, the first latch portion 54 on end segment 50 extends inward a distance sufficient to pass through the mating second latch portion 56 in adjacent end segment 52 to latch the parts together and restrain circumferential movement in one direction (clockwise in FIG. 3B) to restrain separation of the end segments 50, 52 and the cage sidewall 20 and connected parts. The location of the first and second latch portions 54, 56 may be on opposing end segments 50, 52, or on different parts of the cage 14. The first and second latch portions 54, 56 can have other engaging configurations, including tabs extending radially from the end segments 50, 52 with threaded fasteners, other elongated fasteners, spot welding, adhesives, etc., holding the tabs together.

There are advantageously two sets of the first and second latch portions 54, 56, one set located at a bottom portion of the cage sidewall 20 and another set at a top portion of the cage sidewall 20 adjacent the cage feet 18, to help maintain the segments of the cage sidewall 20 generally parallel to the assembly longitudinal axis 16 when installed in the concrete floor 36. If only one set of the first and second latch portions 54, 56 are used then portions of the cage sidewall 20 could tilt relative to each other and make it more difficult to insert the distal end of the cage sidewall 20 and cage 14 (the end adjacent distal ends 24 of the cage arms 22), into the passage 34 during installation.

For assembly and installation, the cage 14, or portions of the cage 14, are preferably bent at each fold line 49 to form a cylindrical cage that is centered along the assembly longitudinal axis 16 and encircles the opening 12, with the splayed cage feet 18 extending laterally outward. The cage feet 18 are then fastened to the surface of the first and second fire ring portions 10a,b which faces the concrete floor 36 when installed. Spot welding is believed suitable to permanently connect the parts together and the splayed cage feet 18 provide a large surface for spot welding or otherwise connecting the parts together, such as by adhesives, mechanical fasteners, friction welding and other mechanisms which are preferably permanent. Passing the cage feet 18 through one or more slots on the fire ring 10, with or without bending the cage fee to resist separation, may also be used to releasably connect the cage 14 to the fire ring 10.

The cage 14 forms a hinge when the first and second fire ring portions 10a, 10b are connected to different portions of the cage 14. The fold lines 49 create weakened lines that form a living hinge that flexes along the fold lines without fatigue fracturing—at least for as many bending fluctuations as the cage 14 is likely to experience during its life. The fold lines 49 segmenting the cage sidewall 20 provide a plurality of potential flexible hinge locations, but connecting the cage feet 18 to the fire rings limits that potential flexing. Moreover, the retainer ring 31 is fastened to the inside of the cage sidewall 20, preferably by spot welding the legs 80 to the cage sidewall 20, or alternatively fastening the ends of legs 80 to the respective first and second fire ring portions 10a,b, preferably by spot welding them to the flange 13 encircling opening 12. Advantageously, the cage 14 flexes about only one fold line 49a (FIG. 6B) and that fold line is aligned in a plane passing along the assembly longitudinal axis 16, the center of opening 12 and the juncture of the free (latched) ends of the cage sidewall 20 of the cage 14, ideally the free edges of end segments 50, 52. The hinge line 49a and assembly longitudinal axis 16 are thus preferably in the same plane. The juncture of the first and second fire ring portions 10a,b is advantageously on or adjacent to that same plane. Advantageously, that plane bisects the triangular shape of the first end 40.

The use of a hinge line 49a reduces the outer diameter of the cage 14, which is important because the cage 14 has to fit inside the passage 34. An axial rotating hinge could be used but that hinge would either extend inward or outward from the cage sidewall 20. If the hinge extends outward it may require a smaller diameter cage in order to fit inside the passage 34, it may create a larger annular space between the sidewall and the passage which is wasteful and must still be sealed during a fire, and it may push the assembly longitudinal axis sideways to a location that is offset from the assembly longitudinal axis 16 of the passage 34 which makes it difficult to pass a tube 30 through the fire stop assembly. If the hinge extends inward from the cage sidewall 20, it interrupts the thickness and continuity of the intumescent ring 26 and may cause uneven expansion during a fire, and degrade the sealing performance of the intumescent ring 26—especially if a gap in the cage sidewall 20 is formed above or below the hinge through which intumescent material may expand during a fire. The hinge line 49a allows a uniform cage sidewall 20 and a more uniform and smaller space between the cage sidewall 20 and the passage 34.

Advantageously, half of the cage 14 and its cage sidewall 20 is connected to first fire ring portion 10a and the other half of the cage 14 and its cage sidewall 20 is connected to the second fire ring portion 10b, with both portions 10a,b having the shared fold line 49 so the first and second fire ring portions 10a,b and the cage 14 hinge along and rotate along one vertical hinge line 49a. This hinging of the first and second fire ring portions 10a,b about the cage sidewall 20, allows the free end segments 50, 52 of the cage sidewall 20 to move away from each other to open and to move toward each other to close. As described elsewhere, this opening and closing also allows the free ends 29a, 29b of split inner smoke ring 28 and free ends 81a, 81b of retainer ring 31 to move away from each other to open and to move toward each other to close. As described elsewhere, this opening and closing also allows the free ends 33a, 33b of split outer smoke ring 32 to move away from each other to open and to move toward each other to close.

Figure 3A:
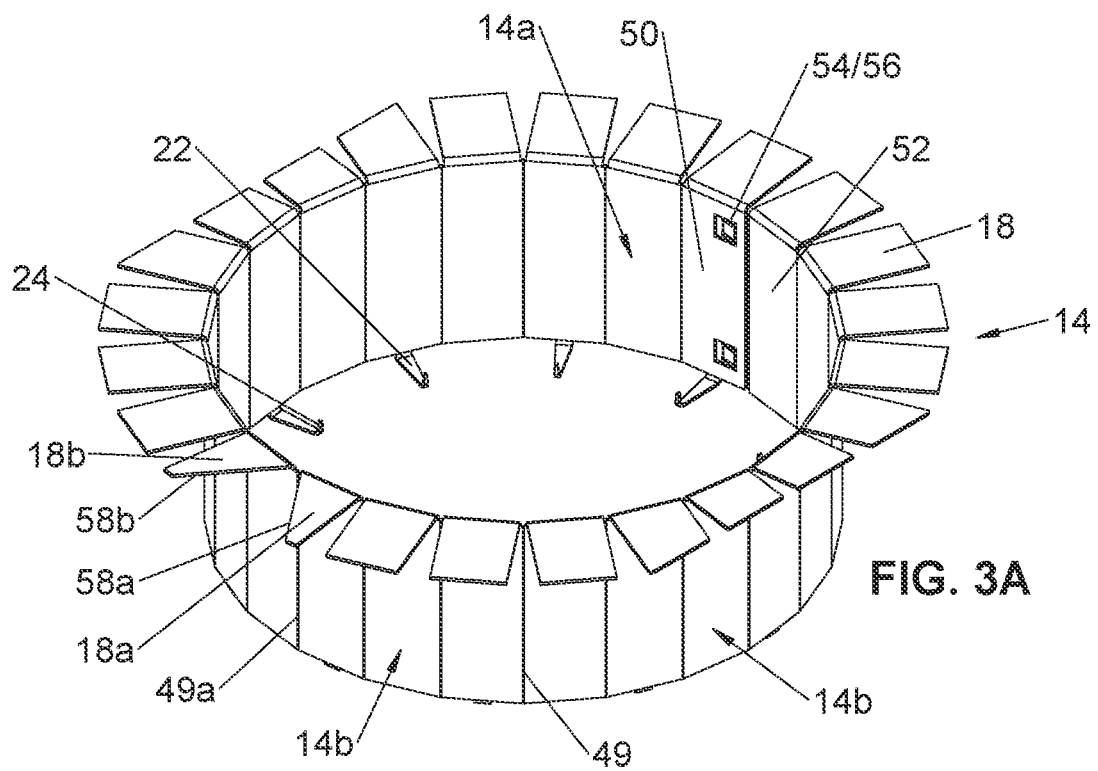
FIG. 3A is a top perspective view of a cage of FIG. 1A in a closed position.
Figure 3B:
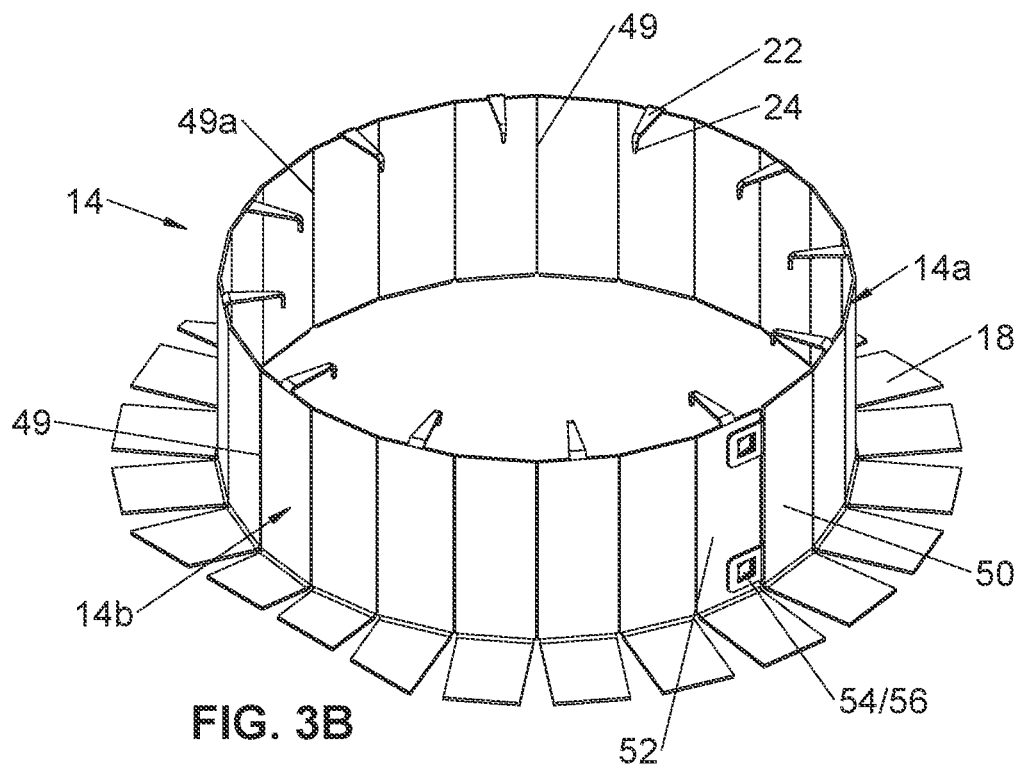
FIG. 3B is a perspective view of the cage of FIG. 3A in a closed position; but rotated 180 degrees to face upward.

The cage feet 18 on adjacent sides of fold line 49a forming the hinge are advantageously shaped so they do not hit each other when the cage 14 and first and second fire ring portions 10a,b rotate about that hinge line 49a. Thus, as seen in FIGS. 1 and 3 where cage feet 18a, 18b on opposing sides of fold line 49 which forms the hinge 49a for the cage 14 to open and close, have a triangular shape formed by an inclined edge 58a, 58b on the respective cage feet 18a, 18b.

The inclined edges 58a, 58b are angled away from each other as the radial distance from the assembly longitudinal axis 16 increases and as the distance from the sidewall 20 increases. Thus, as the cage 14 rotates about the hinge line 49a the inclined edges 58a, 58b approach each other and may be configured to abut each other to limit the amount of rotation of each half of the cage 14. The sidewall 20 advantageously has the cage feet 18 shaped to prevent interference with each other when the cage 14 is opened.

The fold line 49a is preferably opposite the juncture of end segments 50, 52, between angled cage feet 18a, 18b. The cage feet 18 may extend different lengths outward away from the cage sidewall 20. As seen in FIGS. 1-4, the fire ring 10 has two straight, parallel sides parallel to the plane about which the two portions of the fire stop assembly open and close, with the straight sides overlapping the circular arrangement of the care feet 18 so the cage feet 18 are cut off to end flush with the straight sides. The straight sides allow multiple fire stop assemblies to be used close together and also allow the fire ring 10 to fit inside or mate with plumbing brackets having predetermined shapes. But the straight sides are not required, and the fire ring 10 may have diverse shapes.

Scoring, rolling or stamping the cage sidewall 20 to form the fold lines 49 and hinge line 49a provides a cost effective way to produce and assemble the cage 14. This manufacturing and assembly technique has the disadvantage that repeated flexing of the fold line acting as hinge line 49a will lead to fatigue fracture of the hinge line 49a, especially when the cage sidewall 20 is made of metal. The material used to make the sidewall 20 and the method used to make the fold lines 49 are selected to produce a fold line 49a that allows the fire stop portions to be opened a distance sufficient to encircle the expected tube 30 and then closed, at least five times and preferably ten times before there is any separation of the cage sidewall 20 along the hinge line 49a and more preferably the hinge line 49a at least partially separates between 3 and 20 opening and closing cycles. One opening and closing cycle moves the sidewall segments 50, 52 from the closed position to an open position where the sidewall segments 50, 52 are separated a distance corresponding to the maximum tube diameter for which the assembly is advertised for use—plus one inch.

Referring to FIGS. 1 and 3, the cage arms 22 extend inward with distal inner ends 24 extending upward and thus form a ring of cage arms 22 around the lower periphery of the cage sidewall 20 encircling the assembly longitudinal axis 16. The intumescent ring 26 rests on the cage arms 22, between the distal inner ends 24 of those cage arms 22 and the inward facing side of the sidewall cage 20. The intumescent ring 26 is shown as formed of two concentric rings of material, each formed of a single, elongated strip of intumescent material that is curved into a circle to form an inner and outer ring. The number of concentric intumescent rings will vary with the application from a single intumescent ring, to several, depending on the amount of expansion in the lateral plane that is desired and the intumescent material. From one to three concentric intumescent rings, each about 0.2 to 0.3 inches thick, are believed sufficient for pipes four inches in diameter or smaller, with smaller thicknesses suitable for smaller diameter tubes of 0.5 to 1.5 inches outer diameter.

The cage arms 22 are advantageously sized to have a radial length slightly larger than the radial thickness of the intumescent ring 26 so the intumescent ring of material can be easily inserted into the distal inner ends 24 of the cage arms and moved axially to rest against the outwardly extending portion of the cage arms 22. The distal inner ends 24 are advantageously inclined to form a pointed tip so the distal inner ends 24 dig into or cut into the abutting portion of the intumescent ring 26 to engage and hold the intumescent ring 26. The distal inner ends 24 of the cage arms 22 are preferably parallel to the assembly longitudinal axis 16 and cage sidewall 20 when installed in the concrete floor 36. The distal inner ends 24 are shown as having a short length along assembly longitudinal axis 16, but may have any suitable length shorter than the axial length of the intumescent material so as to center and retain the intumescent ring 26.

The inner and outer smoke rings 28, 32 are advantageously made of closed cell, thermoplastic urethane (TPU) or other suitable material. The TPU material is compressible and compresses flat into or against any encircled plastic pipe when the intumescent ring 26 expands during a fire. The inner and outer smoke rings 28, 32 are connected to one of an inside or outside wall of parts that are preferably cylindrical and preferably concentric, with the inner and outer smoke rings 28, 32 also contacting an adjacent concentric part to provide a barrier to smoke moving along the assembly longitudinal axis 16. The inner and outer smoke rings 28, 32 are advantageously compressible to ensure they extend between walls of the parts between which they are inserted during assembly and installation, and by making them slightly larger than the expected gap between parts, the compressibility of the inner and outer smoke rings 28, 32 allows for size differences and misalignments and also helps ensure the space between the parts is blocked by the inner and outer smoke rings 28, 32.

The intumescent ring 26 may be of any suitable intumescent material which expands when exposed to the high temperatures that occur during fires. The axial height of the intumescent ring 26 may vary according to the diameter of opening through which various pipes or other conduits may pass, and may vary according to the strength of the seal formed when the intumescent material expands. The axial length of the intumescent ring 26 along the assembly longitudinal axis 16 is preferably greater than the axial distance from the cage arms 22 to the distal end of the cage sidewall 20. The cage arms 22 are preferably located relative to the fire ring 10 a distance sufficient to ensure all of the intumescent ring is located inside the passage 34, and that the bottom end of the intumescent ring 26 extends further into the passage 34 than the bottom end of the cage sidewall 20 so the bottom end of the intumescent ring 26 can expand both inward and outward.

The portion of the intumescent ring 26 within the cage sidewall 20 is constrained by the cage sidewall 20 to expand inward and seal against the tube 30 (which can take the form of various wires, tubes, conduits, pipes or other elongated members) passing through the passage 34 through the concrete. Thus, at least the bottom end of the intumescent ring 26 is far enough from the fire ring 10 so that it extends into the passage 34 and the bottom end of the ring 26 extends beyond the bottom of the cage sidewall 20 a distance sufficient that it can form a fluid and gas seal with the passage 34 through the concrete during a fire. A cage 14 with the cage side wall 20 located so that about one half to one quarter of the axial length of the intumescent ring 26 measured along assembly longitudinal axis 16 extends beyond the bottom side of the cage sidewall 20, is believed suitable.

A cage 14 has an outer diameter of 4-5 inches, and the intumescent ring 26 has about one to 1.5 inches of axial length within the cage 14, and about 0.5 to 1.5 inches of axial length extending beyond the distal (bottom) end of the cage 14, is believed suitable for passages 34 about 4 to 6 inches diameter. An intumescent ring 26 extending about 0.5 to 3 inches beyond the lower end of the sidewall 20 is believed suitable for such diameters. It is believed suitable to have an intumescent ring 26 having a lower end connected to and held by cage arms 22 and distal inner ends 24, and in which the intumescent ring has a length L measured along the assembly longitudinal axis 16, and where the intumescent ring 26 extends beyond the cage sidewalls 20 a first distance preferably between 0.2L and L, and less preferably a first distance between 0.2L and 2L. Advantageously, the diameter of cage 14 is about half an inch smaller than the diameter of the passage 34.

The passage 34 is usually bored or drilled after the concrete floor 36 is hardened or it may be formed by placing a tube in the planned deck and pouring concrete around the tube. The diameter of the passage may vary with the diameter of the drill or boring tool. The roughness and shape of the passage may vary as construction workers do not always hold the drill at the same angle the entire time the hole is being drilled. As used herein, references to a "generally cylindrical" passage or hole include the variations that arise from forming the passage, and these usually include axial variations (e.g., tilt) of up to an inch. The "generally cylindrical" passages or holes also include variations on the desired circular cross-section such as oval or multi-lobed cross-sections that are usually within an inch of the desired circular section. The "generally cylindrical" passage also refers to a majority of the length of the hole at the center of the concrete floor or slab 36 because the concrete may spall if the side of the concrete from which the drill bit exits when the hole is drilled is not adequately supported. The concrete may also chip and spall at the surface where the drill enters the concrete may chip and spall as the hole is drilled.

The assembly process for the fire stop assembly is roughly as follows. The first and second fire ring portions 10a,b of the fire ring 10 are placed in the closed position and the cage feet 18 are spot welded or otherwise connected to the first and second fire ring portions 10a,b so that the first sidewall portion 20a is fastened to first fire ring portion 10a, and second sidewall portion 20b is fastened to second fire ring portion 10b. The sidewalls 20 encircle the opening 12 in fire ring 10, and are positioned before fastening so the end segments 50, 52 are located by the ends 42, 43. Each retainer ring portion 31a, 31b is fastened to the respective first and second cage sidewall portion 20a,b, preferably by spot welding, adhesives, mechanical interlocking connections, fasteners, etc. The legs 80 help position the retainer ring portions 31a,b a predetermined distance from the first and second fire ring portions 10a,b. The legs 80 may also be fastened to the respective first and second fire ring portions 10a,b using the same connection mechanisms as the retainer ring 31. The intumescent ring 26 is inserted into the inside of the cage 14 so the intumescent ring is between the cage arms 22 and the retainer ring 31.

Part of the intumescent ring 26 extends beyond the distal (bottom) portion of the cage 14 (i.e., below the cage sidewall 20). The fire stop assembly is usually assembled with the cage 14 extending upward, and then the assembly is inverted for use when it is pushed down into the passage 34. Thus, the intumescent ring 26 may rest against cage arms 22 when installed, and rest against the retainer ring 31 during assembly and before installation. Advantageously, the retainer ring 31 extends inward a radial distance sufficient to support at least half the radial thickness of the intumescent ring 26, but does not extend inward a distance sufficient to contact the tube 30 when installed.

The intumescent ring 26 is preferably a split ring having at least one separation forming two separate but adjacent ends 27a, 27b that may directly contact each other during assembly and preferably during installation and during a fire. The intumescent ring 26 may be slit twice to form the two separable first and second portions 26a,b with respective ends 27a,c on the first portion 26a, and the ends 27b,d on the second portion 26b. Each opposing end 27a,c of first intumescent ring portion 26a is advantageously located to extend to the circumferential end of the first and second end segments 50, 52. If the assembly were used only for passages with no preexisting tube 30, the intumescent ring could be a continuous ring with no slit and inserted into the cage arms 22 after the cage 14 was formed and latched together. Alternatively, the overlapping ends 40, 41 of the first and second fire ring portions 10a,b could be spot welded together or otherwise fastened together at the time of manufacture, or just before installation.

The basic drop-in fire stop assembly includes the fire ring 10, the cage 14, the retainer ring 31 and the intumescent ring 26. The first and second smoke rings 28, 32 are optional, but preferably included. The inner smoke ring 28 is placed inside the intumescent ring 26 and has its outer portion held in position by various retention mechanisms, such adhesives, or piercing fasteners passing through the inner smoke ring 28 and into the intumescent material. A permanent connection is preferred so that the inner smoke ring 28 is not dislodged if the tube 30 (e.g., pipe or pipes, conduits, cables, wires, or other elongated members) is passed through the opening in the inner smoke ring 28. Adhesives are believed preferable. The inner smoke ring 28 is preferably annular in shape and has an inner diameter sized to resiliently engage the outer portion or outer diameter of an expected tube 30 (e.g., pipe(s), wire bundle(s), conduit(s), or one or more other elongated members) passing through the passage 34. An inner opening smaller in size than the expected size of the tube 30 is preferred so as to provide a resilient connection and a seal to prevent passage of smoke. An inner smoke ring 28 of ⅜ inch thick, closed cell TPU is believed suitable for pipes about 4 inches in diameter or smaller.

The outer smoke ring 32 is placed around the outer surface of either the intumescent ring 26, or preferably placed around the distal (bottom) end of the cage 14 and its sidewall 20. The outer smoke ring 32 may be fastened to the intumescent ring 26 but is preferably fastened to the cage 14 using adhesives, mechanical interlocking connections or fasteners. A permanent connection is preferred and adhesives are believed preferable. An outer smoke ring 32 of ³⁄₁₆ inch thick, closed cell TPU is believed suitable for pipes about 4-6 inches in diameter. The outer diameter of outer smoke ring 32 is selected to form an interference fit with the expected diameter or shape of passage 34 so as to resiliently press against and seal against the passage 34. The order in which the intumescent ring 28, inner smoke ring 28 and outer smoke ring 32 are installed can vary. The cage 14 and the first and second fire ring portions 10a,b may be open or closed for all or portions of the formation process.

The fire stop assembly is preferably configured to fit a range of different diameters of the tube 30, with the tube diameters typically differing by one half inch in diameter for passages from 1 inch to 3 inches, and increasing by one inch for diameters from 4 to 8 inches in diameter, with larger ranges used as the pipe diameter increases. Thus, for example, the cage 14 could have the inner smoke ring 28 with an inner diameter configured to resiliently engage a tube 30 having a diameter of 3-4 inches, with the outer smoke ring 32 configured to resiliently engage a passage 34 having a diameter of about 4.5 to 5 inches, and with the intumescent ring 26 configured to block the passage 34 during a fire by expanding both inward and outward relative to the assembly longitudinal axis 16.

The installation and use of the assembly are described using a floor, recognizing the orientation will be changed if the assembly is inserted into a hole through vertical wall or other inclined concrete slab. The assembly is usually installed after the concrete is poured, finished and hardened to form the concrete wall or concrete floor 36. If not formed during pouring of the concrete floor 36, the passage 34 may be drilled or bored through a hardened concrete floor. Circular holes resulting in cylindrical passages are the predominant shape of the passage 34. The tube 30 (which includes pipes, conduits, wires or other elongated members) may be placed through the passage 34 before or after installation of the assembly.

If the tube 30 does not already extend through the passage 34 then once the assembly of the cage 14, the retainer ring 31 and the intumescent ring 26 is formed, the cage 14 and its sidewall portions 20a,b are latched together in the closed position. The cage-end of the latched-close assembly is inserted into the passage 34 from the top floor surface 36a of the concrete floor 36 and moved downward along the passage 34 until the fire ring 10 contacts the top concrete surface 36a whereupon the fire ring 10 is fastened to the concrete floor 36. Preferably the assembly is inserted with at least one of the inner and outer smoke rings 28, 32 fastened in the assembly, but those smoke rings may be omitted. The assembly is preferably rotated about axis 16 to achieve any advantageous fastening location presented by the top surface of the floor.

The assembly can also be used to retrofit a preexisting passage 34 through a concrete floor or wall, which has a preexisting tube 30 (e.g., one or more pipes, wires, conduits or other elongated members) already extending through the passage 34. If the tube 30 already extends through the passage 34 then the assembly is spread apart to the open position, passed laterally across a portion of the tube and then closed to encircle the tube, after which the closed assembly is slid along the tube to insert the cage 14 into the passage until the fire ring can be fastened to the top floor surface 36a of the concrete floor 36. The assembly is spread apart to the open position by rotating the first fire ring portion 10a, the first sidewall portion 20a, the first portion 31a of the retainer ring 31, the first portion 26a of the intumescent ring 26, the first portion 28a of the inner smoke ring 28, and the first portion 32a of the outer smoke ring 32 together, and relative to the second portion 10b, the second sidewall portion 20b, the second portion 31b of the retainer ring 31, the second portion 26b of the intumescent ring 26, the second portion 28b of the inner smoke ring 28 and the second portion 32b of the outer smoke ring 32. The various portions rotate like a clam-shell device about the living hinge in cage 14 along the hinge line 49a to open and close.

After the axis of the tube 30 is aligned with the assembly longitudinal axis 30, the two assembly portions are moved to the closed position. The first and second latch segments 54 and 56 on the cage sidewall 20 of cage 14 engage to hold the parts together. The various parts of the assembly may be connected as described above, except in this version it is useful to have the intumescent ring 26, the inner smoke ring 28 and the outer smoke ring 32 advantageously have at least one split line along which the adjacent ends of the intumescent ring 26, inner smoke ring 28 and outer smoke ring 32 can move apart to open in a clam-shell manner along with the cage 14, and close with the cage 14. These rings 26, 28, 32 may be rings with a single split that allows the split ends (e.g., 27a, 27b) to move apart to an open position while a portion of the ring opposite the split ends further apart than a bent portion which remains connected. These rings 26, 28, 32 may also have two separate segments as described later with each segment having open positions with one pair of ends that move much farther apart in the open position than a second pair of ends on the opposing side of the rings that remain adjacent each other but may physically separate in the open position. When closed, the assembly is slid along the tube 30 until the fire ring 10 contacts the concrete floor 36 whereupon the fire ring 10 is preferably rotated to any desired position and fastened to the concrete floor 36.

Any slight gap or gaps in the adjacent ends of the intumescent ring 26, or the inner and outer smoke rings 28, 32 are believed small enough that they do not make the ability to block smoke during fires unacceptable. Also, because the clam-shell opening and closing motion makes the ends of the intumescent ring 26, the inner smoke ring 28 and the outer smoke ring 32 approach each other in a tangential or circumferential direction, there is believed to be little or no gap between the ends that are opened and closed.

In the two segment version of the assembly mentioned above, the intumescent ring, inner smoke ring and outer smoke ring are split twice to form two separate and separable parts that are separately connected to the respective first and second sidewall portions 20a, b. The inner smoke ring 28 is placed inside the intumescent ring 26 with the ends 29a, 29b, 29c, 29d aligned with the diameter through the assembly longitudinal axis 16 and the hinge line or the connection between end segments 50, 52. The inner smoke ring portions 28a, 28b are connected to the respective intumescent ring portions 26a, 26b with the ends 29a, 29b, 29c, 29d aligned with the respective ends 26a, 26b, 26c, 26d of the intumescent ring 26 to form an annular encircling smoke ring in the closed position and an open, clam-shell position to encircle the tube 30 in the open position. The connection between the inner smoke ring 28 and the intumescent ring is as described above, preferably by adhesives or various retention mechanisms, including mechanical fasteners. The inner smoke ring 28 is preferably annular in shape when the cage 14 is in the closed position and has an inner diameter sized to abut against an outer diameter of an expected tube (e.g., pipe(s), wire or cable bundle(s), conduit(s), or one or more other elongated members) passing through the passage 34.

In the assembly using two separate and separable portions on the various rings, the outer smoke ring 32 is placed outside of and connected to the intumescent ring 26 or more preferably, outside the cage sidewall 20, with the ends 33a, 33b, 33c and 33d aligned with the plane through the axis 16 and the hinge line or the connection between end segments 50, 52. The outer smoke ring portions 33a, 33b are connected to the respective intumescent ring portions 26a, 26b or connected to the cage sidewall 20 with the ends of the outer smoke ring 33a, 33b, 33c, 33d aligned with the respective ends 26a, 26b, 26c, 26d of the intumescent ring 26 or aligned with the end segments 50, 52 and the diametrically opposite segments of the sidewall 20 to form an annular encircling outer smoke ring in the closed position and an open, clam-shell position to encircle the tube 30 in the open position. The connection between the outer smoke ring 32 and the intumescent ring 26 or sidewall 20 is as described above, preferably by adhesives or various permanent retention mechanisms such as impaling or mechanical fasteners. The outer smoke ring 32 is preferably annular in shape when the cage 14 is in the closed position and has an outer diameter sized to abut against an inner diameter or wall of the passage 34.

Once the clamshell fire ring 10, the cage 14 and the rings 26, 28, 32 are in the closed position encircling the tube 30, the fire ring 10 may have its first and second fire ring portions 10a,b fastened together (preferably releasably fastened together) by engaging latch segments 54, 56 on the cage 14 and then fastening the fire ring 10 is fastened to the top surface 36a of the concrete floor 36 as described above after sliding the assembly along the tube 30—to the extent needed to achieve the connection with top floor surface 36a.

During a fire, the heat and smoke pass upward, with the inner and outer smoke rings 28, 32 blocking passage of the smoke through the passage 34. The smoke rings 28, 32 are made of a fire resistant material and may be made of an open cell intumescent material to allow compressibility, but lack the large expansion coefficient of the intumescent material. As the heat and smoke rise from the bottom of passage 34 toward the top floor surface 36a, the bottom of the intumescent ring 26 is retained only by the cage arms 20, which expose a large amount of the bottom and inner facing surface of the intumescent ring 26 to heat and smoke. Advantageously, over 80% and preferably over 90% of the area of the bottom of the intumescent ring 26 in the plane orthogonal to assembly axis 16 is directly exposed to heat and smoke, and more than that portion of the inward facing surface of the intumescent ring 26 is directly exposed to heat and smoke.

The outer smoke ring 32 directs hot smoke and heat back into the passage 34 and into the inside of the assembly, with the mastic ring 38 advantageously adhering the fire stop 10 to the top floor surface 36a of the concrete to provide a further containment barrier for smoke, and to hold the fire ring and assembly in position while providing a moisture barrier. The outer smoke ring 32 is located at the fire ring 10 near the top of the passage 34 and thus helps trap the hot smoke and heat in the annular space between the cage 14 and the passage 34 so as to rapidly heat the intumescent ring 26. The inner smoke ring 28 is advantageously fastened concentric with the outer smoke ring 32 so the smoke rings 28, 32 overlap along a major portion of the axial length of the smoke rings 28, 32. As the intumescent ring 26 is heated and expands the cage 14 prevents the portion of the intumescent ring 26 inside the sidewall 22 from expanding outward so the expansion of the intumescent ring 26 is directed to expand inward and press against the tube 30, collapsing and pressing the inner smoke ring 28 against and into the tube 30. The number of rings in the intumescent ring 26 being selected to compress the tube 30 and seal the entire passage 34 formed by the tube 30.

The portion of the intumescent ring 26 that extends downward and below the sidewall 20 and cage 14 expands both laterally inward and outward (and upward along axis 16), and provides a seal against the passage 34 to prevent smoke and fire from passing upward through the annular gap between the cage 14 and passage 34. The bottom portion of the intumescent ring 26 expands outward toward passage 34 and expands downward along the assembly longitudinal axis 16, away from the fire ring 10 and that downward expansion also helps ensure the intumescent ring 26 expands into the passage 34 so as to block the passage 34 and not extrude out past the fire ring 10.

To the extent that the inner and outer smoke rings 28, 32 are fastened to the intumescent ring 26, the expansion of the intumescent ring forces those smoke rings against the surfaces sealed by the respective smoke rings 28, 32 to make form a stronger barrier against the passage of smoke etc. than provided by the respective smoke rings 28, 32. The smoke rings 28, 32 thus provide initial barriers to the passage of smoke and heat through the passage 34 at lower temperatures, with the intumescent ring 26 providing a stronger barrier but at the higher temperatures needed to expand the intumescent ring 26.

There is thus provided a fire stop assembly that may be installed in a passage 34 before any tube 30 is placed through the passage 34, and that may also be retrofit to passages 34 where a tube 30 already extends through the passage 34. There is also provided an apparatus that restricts the passage of smoke through the passage 34 during the start of a fire, before the temperature increases sufficiently to expand the intumescent material. Further, by blocking passage of smoke past the inner and outer smoke rings 28, 32 which act as smoke barriers cause the temperature to increase at the location of the intumescent ring 26 and accelerate the expansion of that intumescent ring 26. The location of the bottom portion of the intumescent ring 26 below the bottom of the cage 14 also allows lateral and axial expansion of the intumescent ring 26 to provide and ensure a complete seal of the passage 34.

Referring to FIGS. 6-10, an embodiment is shown with the intumescent ring supported on opposing axial ends of the intumescent ring and different locations and/or support for the inner smoke ring and outer smoke ring. In these figures, the like parts are generally given the same part number as used above, but incremented by 100. Revised or altered parts are generally given part numbers in the 200 series. As with the embodiments described above, the below embodiments are contemplated to be used with a passage 134 that extends through a concrete floor 136 having a top floor surface 136a and a bottom floor surface 136b.

FIGS. 6-10 disclose a fire ring 210 having first and second portions 210a, 210b that during installation, move relative to each other between an open and closed position to define an opening 112 that is preferably circular when the first and second portions are in a closed position. The first and second fire ring portions 210a, 210b each have a respective free, distal ends 211a, 211b and an opposing hinged or overlapping ends 211c, 211d, respectively. In the open position the free or distal ends 211a, 211b are spread apart to pass around a tube 130, while they are together in the closed position to encircle the tube. The fire ring 210 may have optional stiffening ribs which are depicted as radially oriented, deformed ribs having a semi-circular cross-section.

A first plurality of support arms 202a and respective ends 204a are located on the first fire ring portion 210a and a second plurality of support arms 202b and respective ends 204b are located on the second fire ring portion 210b. The support arms 202a,b extend downward a second distance along longitudinal axis 116 from an inner periphery of the circular opening 112. Advantageously, the ends 204a,b are radial and perpendicular to the support arms 202a,b, so each support arm 202a,b has an L-shape with the ends 204a,b forming the short leg of the L-shape.

A first plurality of retaining arms 206a and respective retaining ends 208a are located on the first fire ring portion 210a and a second plurality of retaining arms 206b and respective retaining ends 208b are located on the second fire ring portion 210b. The retaining arms 206a,b extend downward a second distance along longitudinal axis 116 from an inner periphery of the circular opening 112. Advantageously, the retaining ends 208a,b are radial and perpendicular to the retaining arms 206a,b, so each retaining arm 206a,b has an L-shape with the retaining ends 208 forming the short leg of the L-shape.

The second distance is smaller than the third distance. An inner smoke ring 128 is located between the ends 204a,b and retaining ends 208a,b. Advantageously the retaining ends 208a,b extend inward a distance the same as the radial thickness of the inner smoke ring 128 or smaller, but enough to retain the inner smoke ring 128 in an axial location between the ends 204a,b, 208a,b. Advantageously, the retaining ends 208a,b are located below the ends 204a,b of the support arms 202a,b during use, with each support arm 202a,b interposed between two retaining arms 206a,b, and vice versa.

The axial length of the support arms 202a,b and the retaining arms 206a,b are selected to space the respective ends 204a,b, 208a,b apart a distance that is about the same as the axial height or axial thickness of the inner smoke ring 128. The ends 204a,b, 208a,b advantageously do not extend inward a distance sufficient to contact the tube 130 when the assembly is installed. In use, the inner smoke ring 128 is held in position along the assembly longitudinal axis 116 by the arms and legs 202a,b, 204a,b, 206a,b, and 208a, b. The inner smoke ring 128 is centered around the assembly longitudinal axis 116 by the retainer legs 206a,b. The axial length of the support arms 202a,b is selected so that the respective ends 204a,b are below the top floor surface 136a of a concrete floor 136 and thus the inner smoke ring 128 is inside the passage 134 through the concrete floor 136. The axial length of the support arms 202a,b advantageously considers the axial thickness or axial height of a mastic ring 138 and any other intervening parts affecting the anticipated axial location of the inner smoke ring 128.

A cage 214, having cage portions 214a,b, is connected to the fire ring 210 so as to encircle the opening 112, with the cage 214 extending along an assembly longitudinal axis 116 through the center of the opening 112. The cage 214 has a cage sidewall 220 formed of segments extending along the assembly longitudinal axis 116, with a plurality of cage feet 218 extending inward from a bottom of the cage sidewall 220 of the cage 214 in a direction toward the assembly longitudinal axis 116. Advantageously, each sidewall segment has one foot 218. The opposing circumferential sides of each segment are preferably bounded by fold lines 149, which may be scored, perforated, rolled or otherwise reduced in thickness to form a living hinge so the segments can curve around the assembly longitudinal axis 116. At least one fold line 149 may be located at the juncture of the fire ring portions 210a, 210b to allow the fire ring to rotate between an open and closed position along a hinge line 149a.

The cage sidewall 220 encircles the retaining arms 206a,b and are connected to those retaining arms 206a,b. Advantageously, the cage sidewall 220 directly contacts the outer facing side of the retaining arms 206a,b and are spot-welded to at least one retaining arm 206a,b on each respective cage portions 214a,b. Any other connection mechanism can be used, including adhesives, interlocking parts and threaded fasteners.

Advantageously, the juncture of each support arm 202a,b with the fire ring 210 is offset inward so the base of each support arm 202a,b extends radially inward a short distance corresponding to a radial thickness of the segments on the cage 214 so that the top end of a segment on the cage 214 can nest in that radial offset. Similarly, the juncture of each retaining arm 206 with the fire ring 210 is offset inward toward the assembly longitudinal axis 116 so the base of each retaining arm 206 extends radially inward a short distance corresponding to the radially thickness of the segments of the cage 214 so the top end of a segment on the cage 214 can nest in that radial offset and abut at least one and preferably a plurality of the support arms 202a,b and retaining arms 206. The cage 214 may advantageously fasten to the support arms 202a,b, the retaining arms 206a,b, or both. The cage portions 214a,b rotate with the respective fire ring portions 210a, 210b to which the cage portions are connected, and advantageously rotate about hinge line 149a.

The cage 214 has first and second end segments 150, 152, first and second latch segment 154, 156 in the respective first and second end segments 150, 152 to connect the cage portions 214a,b when the first and second end segments 150, 152 are in the closed position. The fire ring 210 advantageously has one or more, and preferably a plurality of mounting tabs 148. The depicted fire ring 210 is rectangular in shape, with a mounting tab 148 at each corner and a fastener opening 144 in each mounting tab 148.

The fire ring 210 advantageously has the first fire ring portion 210a with the distal ends 211a,c, with at least one end preferably being offset so those ends can overlap each other while the portions 210a, 201b rotate open and closed in a plane. A second fire ring portion 210b has the distal ends 211b,c, with at least one end preferably being offset so those ends can overlap each other while the portions 210a, 210b rotate open and closed in a plane. In the embodiment shown, distal ends 211c,d are overlapping.

The inner smoke ring 128 advantageously has first and second inner smoke ring portions 128a, 128b having respective first or distal or free ends 129a, 129b which are close together and preferably contacting in the closed position, and which are spaced apart in the open position. The first and second inner smoke ring portions 128a, 128b may have respective second ends 129c, 129d which may be on physically separated parts, or which may be omitted if the inner smoke ring 128 bends to form a living hinge generally along hinge line 149a.

Figure 6A:
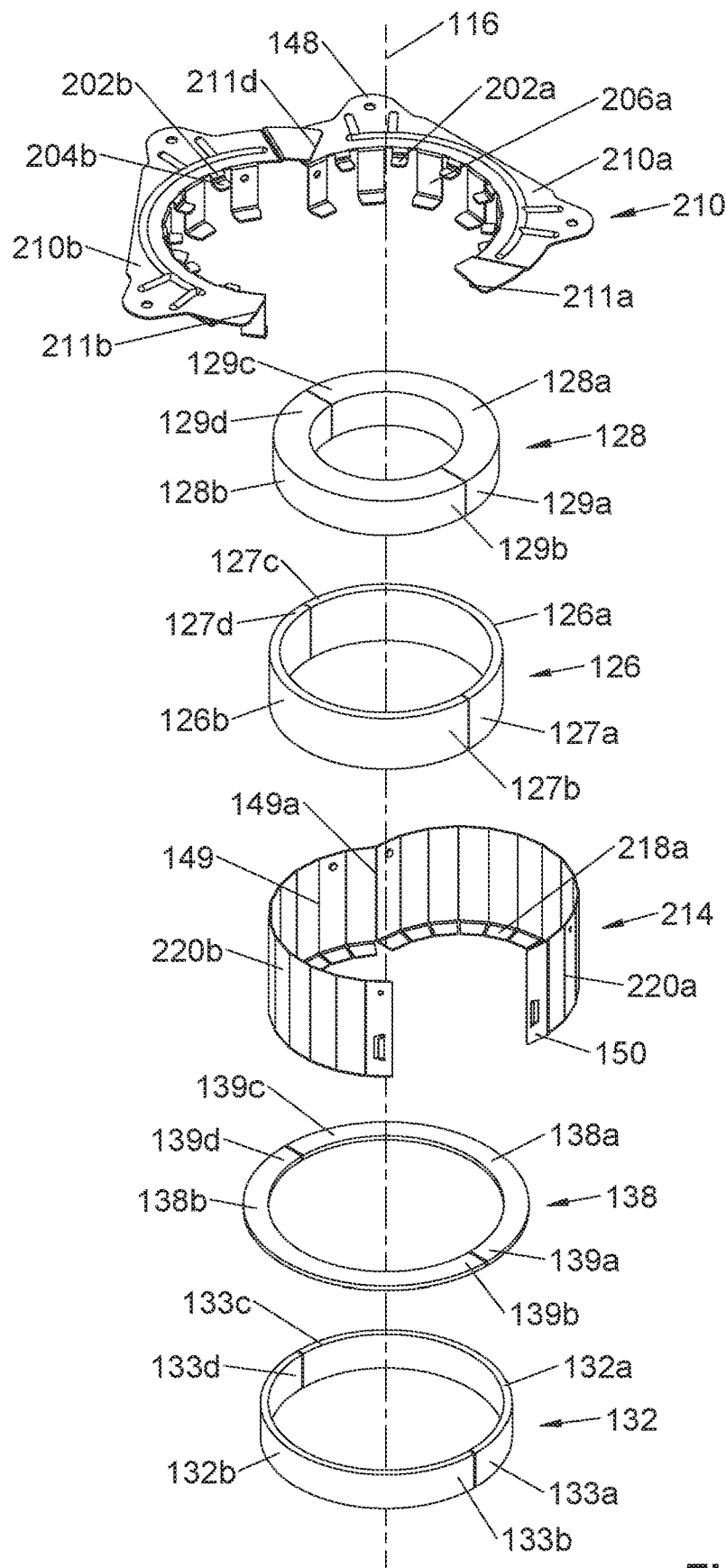
FIG. 6A is an exploded perspective view of a drop-in fire stop assembly for a concrete floor with most of the parts in an open position with the intumescent material supported on opposing axial ends.
Figure 6B:
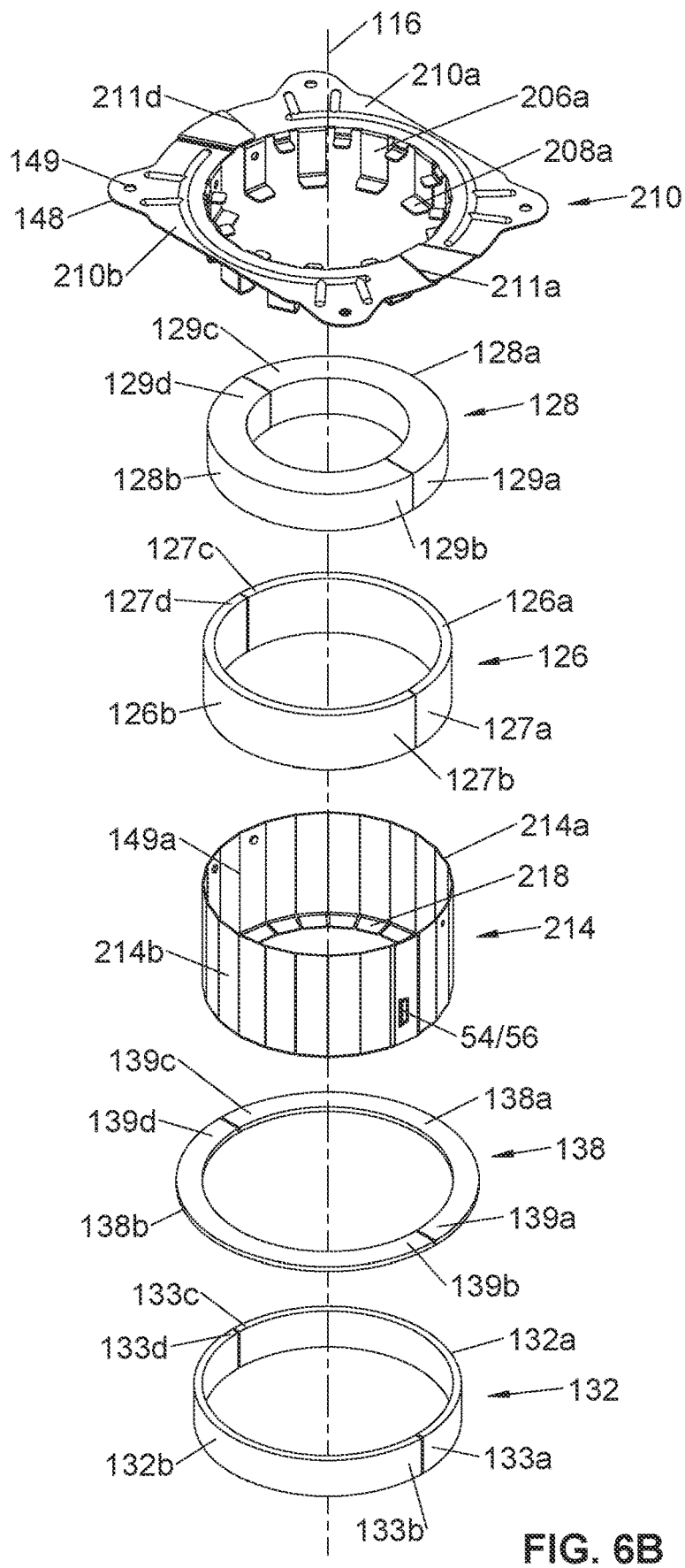
FIG. 6B is an exploded perspective view of a drop-in fire stop assembly of FIG. 5A with the parts in a closed position.
Figure 7A:
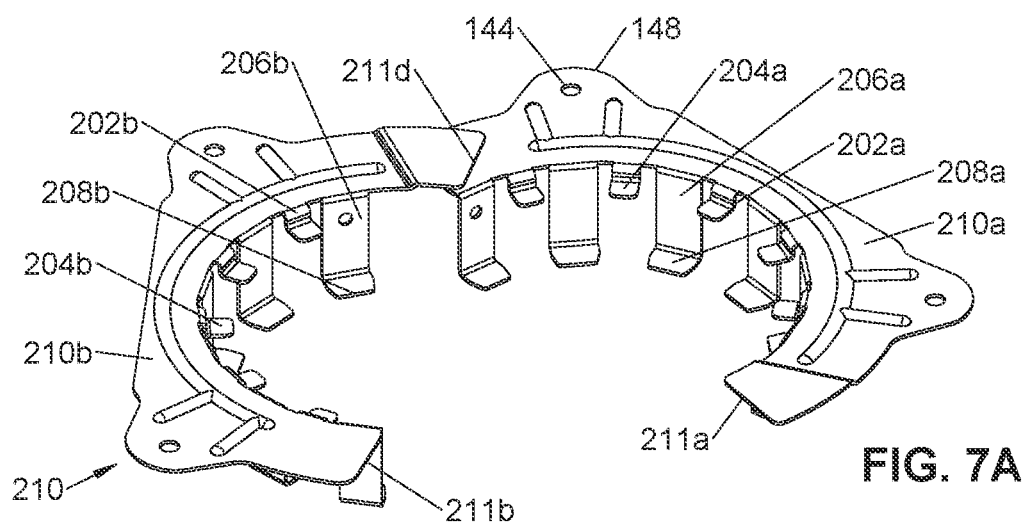
FIG. 7A is top perspective view of a fire ring of FIG. 6A in an open position.
Figure 7B:
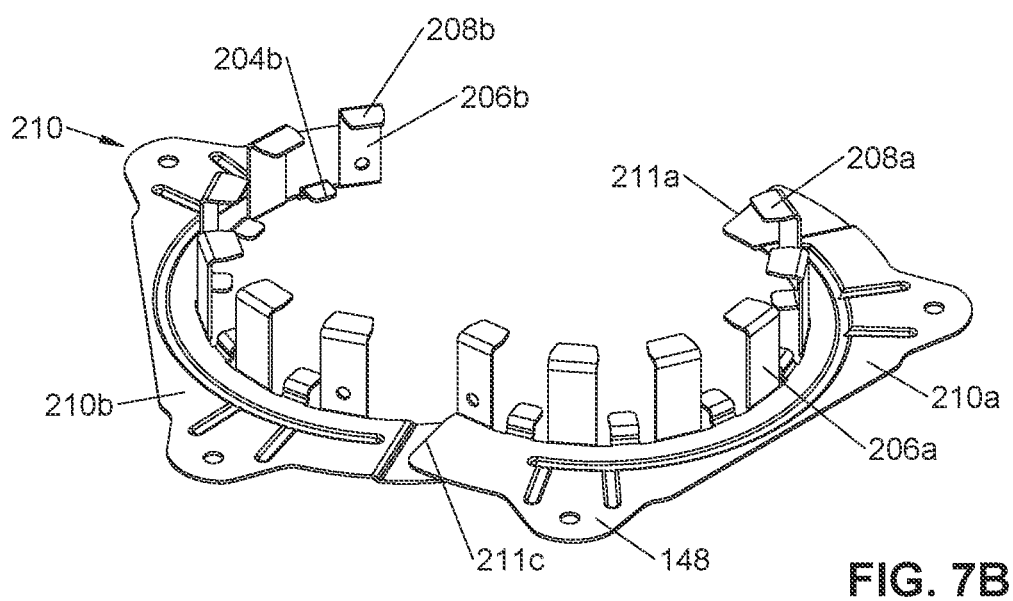
FIG. 7B is a bottom perspective view of the fire ring of FIG. 6A in an open position but rotated 180 degrees to face upward.
Figure 8A:
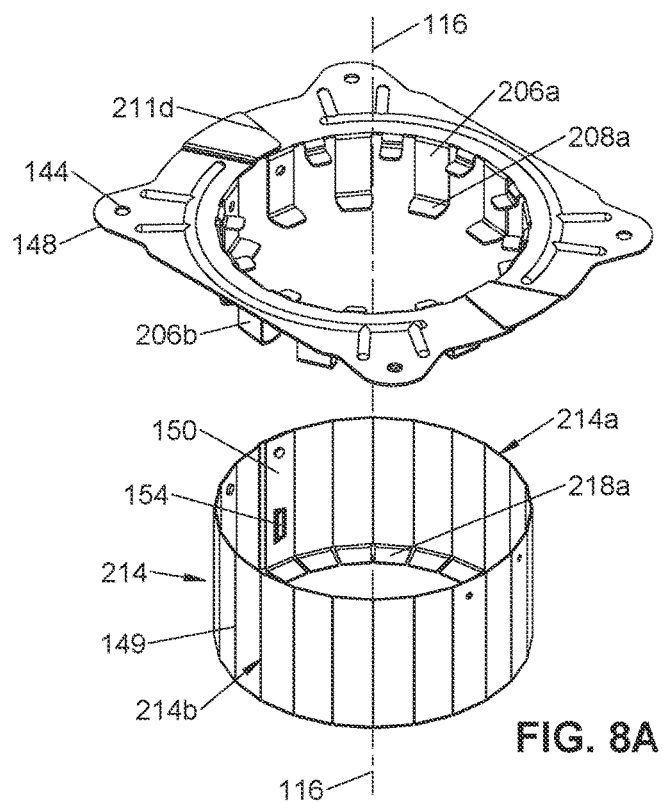
FIG. 8A is a top perspective view of an exploded assembly of a fire ring and a cage of FIG. 6B in a closed position.
Figure 8B:
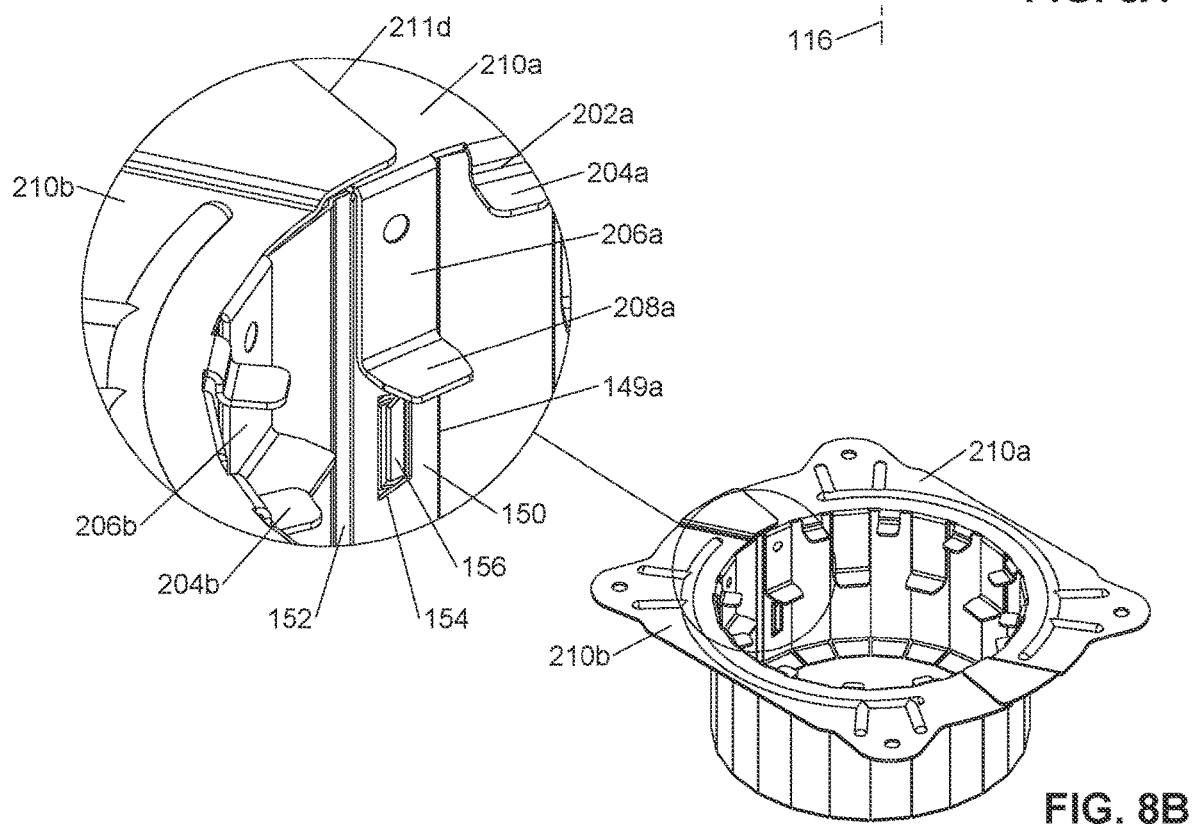
FIG. 8B is a top perspective view of the cage of FIG. 8A in a closed position, with an enlarged view of latching segments of the cage sidewall.
Figure 9A:
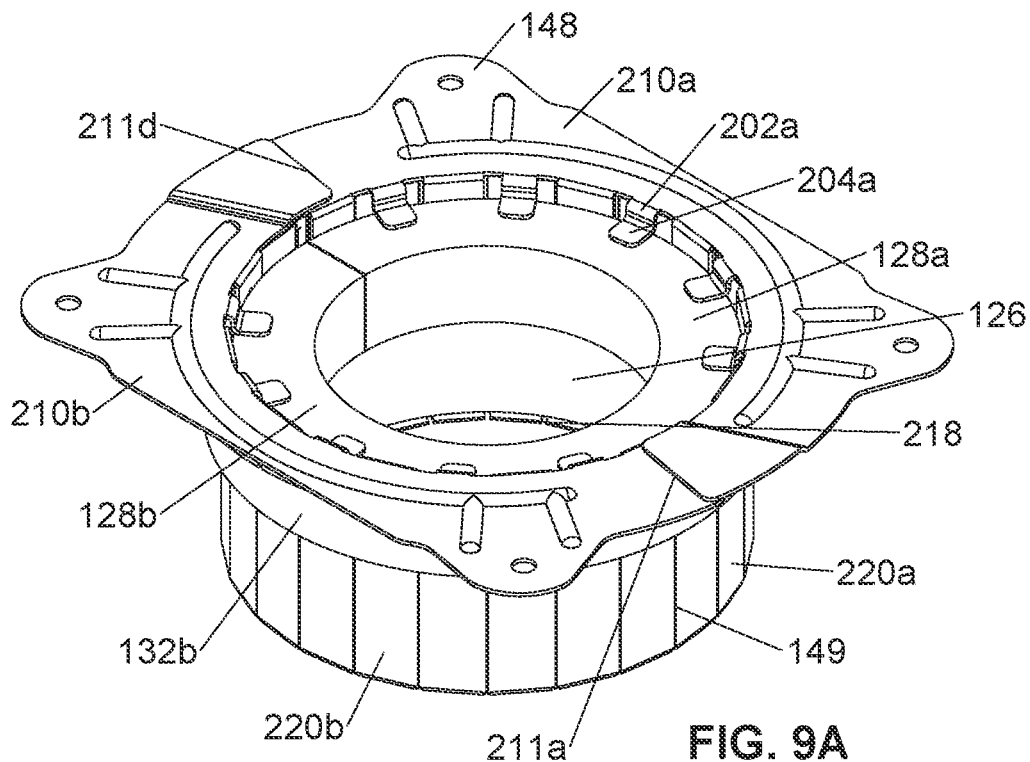
FIG. 9A is a top perspective view of the drop-in fire stop assembly of FIG. 1A, in a closed position.
Figure 9B:
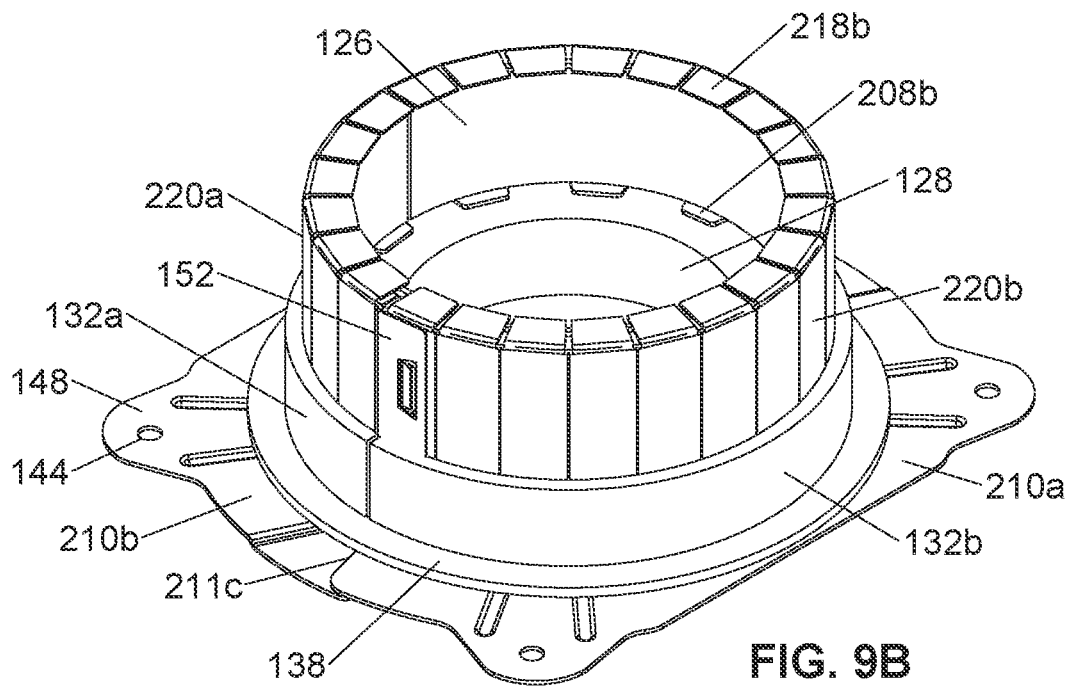
FIG. 9B is a perspective view of the drop-in fire stop assembly of FIG. 4A in a closed position but rotated 180 degrees to face upward.
Figure 10A:
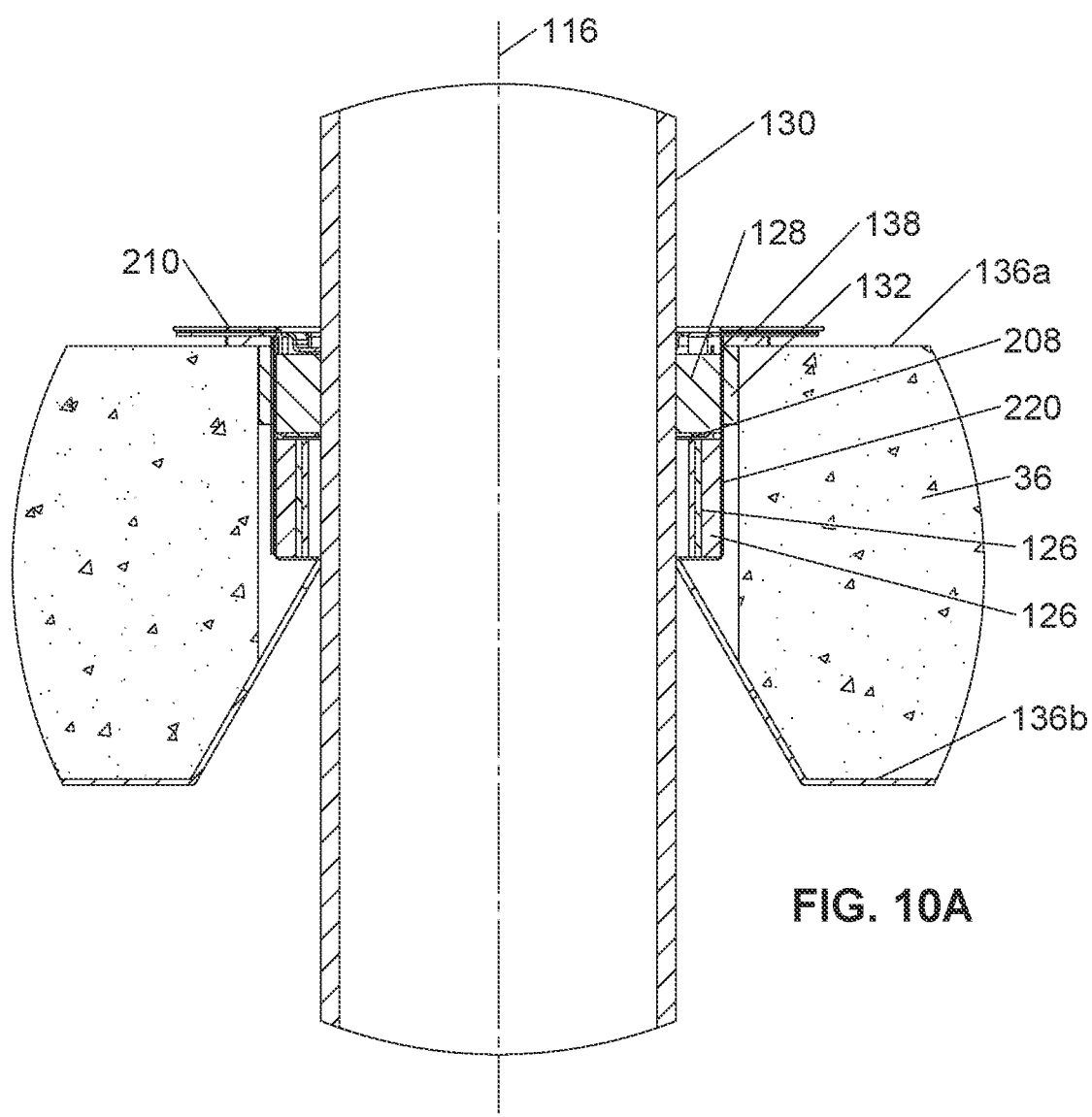
FIG. 10A is a cross sectional view of the drop-in fire stop assembly of FIG. 9A installed a passage containing a tube passing through the assembly.
Figure 10B:
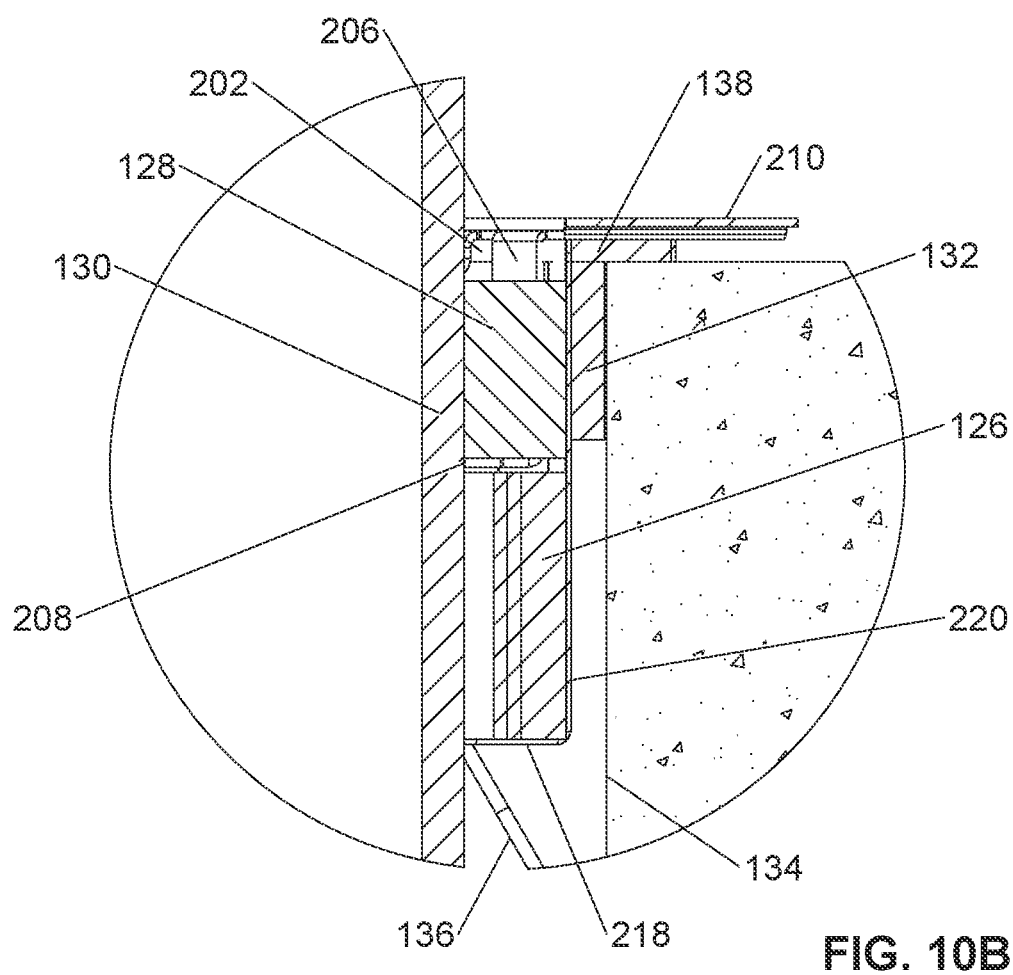
FIG. 10B is an enlarged portion of the cross sectional view of FIG. 10A.

As seen in FIGS. 6, 9 and 10, the inner smoke ring 128 and an intumescent ring 126 is held between the ends 204a,b of the support arms 202a,b and the ends 208a,b of the retaining arms 206a,b. The support arms 202a,b are advantageously long enough to locate all of the inner smoke ring 126 inside the passage 134 through the concrete floor 136. The ends 204a,b, 208a,b do not extend inward enough to contact the tube 130, but the inner smoke ring 128 is configured is resiliently engage the outer surface of the tube 130 and provide a smoke seal with the tube 130. The inwardly extending ends 204a,b, 208a,b of the support arms 202a,b and retaining arms 208a,b hold the inner smoke ring 128 right enough to allow the tube 130 to be inserted through the inner smoke ring 128 along the assembly longitudinal axis 116 without rolling or twisting the inner smoke ring 128.

The intumescent ring 126 is held between the inwardly extending ends 208a,b of the retaining arms 206a,b and the inwardly extending cage feet 218 on the end of the cage 214. The cage feet 218 provide a sufficiently continuous ring or flange that the cage feet 218 limit expansion of the intumescent material along the assembly longitudinal axis 116 past the cage feet 218, and direct the expansion inward toward tube 130 to better seal the passage 134 during a fire. The opposite end of the intumescent ring 126 is blocked from axial expansion out of the passage 134 by the inwardly extending ends 208a,b of the retaining arms 206a,b, and by the inner smoke ring 128.

An outer smoke ring 132 encircles the cage 214 and is preferably located at the fire ring 210, and advantageously overlaps a majority of the axial length of the inner smoke ring 128. An optional mastic ring 138 encircles the cage 214 and is advantageously fastened to the fire ring 210 so the mastic ring 138 is interposed between the fire ring and the concrete surface of the concrete floor 136 to provide a smoke seal preventing smoke from passing through the passage 134 and out past the fire ring 210.

The various rings 126, 128, 132 and 138, are preferably split rings to allow them to open and close in a clam-shell manner with fire ring halves 210a, 210b. Thus, intumescent ring 126 advantageously forms a split ring with at least one split forming first and second adjacent ends 127a, 127b. The intumescent ring 126 advantageously forms two halves, first and second intumescent ring portions 126a, 126b, with the first intumescent ring portion 126a having opposing free ends 127a, 127c and with the second intumescent ring portion 126b having opposing free ends 127b, 127d if separated. The ends 127a, 127b are also referred to as the first and second intumescent ring portion free ends 127a, 127b. These free ends 127a, 127b move toward and away from each other as discussed herein. The free ends 127c, 127d usually remain adjacent to each other even in the open position and may be omitted if the intumescent ring 126 is sufficiently flexible that it can rotate along the rotational axis between the open and closed positions and not physically separate into two separate parts.

Similarly, inner smoke ring 128 advantageously forms a split ring with at least one split forming first and second adjacent ends 129a, 129b. The inner smoke ring 128 may form two halves, first and second portions 128a, 128b, with the first portion 128a having opposing ends 129a, 129c and with the second end 128b having opposing ends 129b, 129d. These inner smoke ring free ends are also referred to as inner smoke ring free ends 129a, 129b, and inner smoke ring free ends 129c and 129d. The free ends 129a, 129b move these free ends 129a, 129b move toward and away from each other as discussed herein. The free ends 129c, 129d usually remain adjacent to each other and may be omitted if the inner smoke ring is sufficiently flexible that it can rotate along the rotational axis between the open and closed positions and not physically separate into two separate parts.

Further, the outer smoke ring 132 advantageously forms a split ring with at least one split forming adjacent first and second ends 133a, 133b. The outer smoke ring 132 may form two halves, first and second outer smoke ring portions 132a,b, with the first outer smoke ring portion 132a having opposing ends 133a, 133c and with the second outer smoke ring portion 132b having opposing ends 133b, 133d. These free ends 132a, 132b are also referred to as smoke ring free ends 133a, 133b, or as outer smoke ring free ends 133c, 133d. These free ends 133a, 133b move toward and away from each other as discussed herein. The free ends 133c, 33d usually remain adjacent to each other and may be omitted if the outer smoke ring 132 is sufficiently flexible that it can rotate along the rotational axis between the open and closed positions and not physically separate into two separate parts.

Also, when present, the mastic ring 138 advantageously forms a split mastic ring with at least one split forming adjacent first and second ends 139a, 319b. The mastic ring 138 may form two halves, first and second portions 138a,b, with the first mastic ring portion 138a having opposing ends 139a, 139c and with the second mastic portion 138b having opposing ends 139c, 139d. These free ends 139a, 139b are also referred to as mastic ring free ends 133a, 133b, or as mastic ring free ends 139c, 139d. These free ends 139a, 139b move toward and away from each other as discussed herein. The free ends 139c, 139d usually remain adjacent to each other and may be omitted because the mastic ring 138 is usually sufficiently flexible that it can rotate along the rotational axis between the open and closed positions and not physically separate into two separate parts.

As used in the context of the intumescent ring 126, the inner smoke ring 128 and the outer smoke ring 132, the term "adjacent" is used to encompass contacting parts or parts that are very close together as at the ends 127c, 127d, 129c, 129d, 133c, 133d, 139c and 139d and is also intended to encompass any physical separation of the free ends 127a, 127b, 129a and 129b, 313a, 133b, 139a and 139b which occur when the two segments of the hinged assembly are in both the open position and the closed position. The open position is large enough to allow tube 130 to pass between the adjacent free ends of the intumescent ring 126, the inner smoke ring 128 and the outer smoke ring 132, and preferably not more than 20 to 40% larger than the tube diameter in order to reduce separation of the free ends 127a, 127b, 129a and 129b, 133a, 133b, 139a and 139b in the open position.

The intumescent ring 126, the inner smoke ring 128, the outer smoke ring 132 and the mastic ring 138 may also have only one slit forming first and second adjacent ends 127a, 127b, first and second ends 129a, 129b, first and second ends 133a, 133b, first and second ends 139a, 319b respectively, with ends 127c, 127d, 129c, 129d, 133c, 133d, 139c and 139d not being physically slit and separated and instead representing ends of portions of the intumescent ring 126, the inner smoke ring 128, the outer smoke ring 132 and the mastic ring 138 on opposing sides of the hinge about which the assembly opens and closes. The advantage of having only one slit and one pair of adjacent ends is that it allows the portion of the respective ring diametrically opposite the slit, to act as a living hinge without requiring a physical separation. In some many cases that can reduce the number of parts, result in simpler manufacturing and assembly, reduce costs, and result in a stronger and more stable ring. There is thus advantageously only one slit in each ring 126, 128, 132 and optional ring 138 which slit is located in the plane along the assembly longitudinal axis 116 and through the location where the first and second end segments 150, 152 contact each other, as described later.

As with the cage of FIGS. 1-5, the cage 114 forms a hinge parallel to the assembly longitudinal axis 116, and the cage 114 is connected to the fire ring 210 so the cage 114, and the fire ring 210 have a first open position allowing the tube 130 parallel to the assembly longitudinal axis 16 to move laterally through an opening between mating but spatially separated parts of the fire ring 210 and the cage 114. The cage 214, intumescent ring 126, inner smoke ring 128, mastic ring 138 and fire ring 210 have a second, closed position where the mating parts are joined to encircle and enclose the elongated tube 130 when the tube's longitudinal axis is coincident with the assembly longitudinal axis 116. The fire ring 210 and the cage 114 and its sidewall 220 along with the intumescent ring 126, the inner smoke ring 128, the outer smoke ring 132, and the mastic ring 138 can thus rotate open and closed about an axis parallel to the assembly longitudinal axis 16 in a clamshell manner so they can fit around a preinstalled tube 130.

The fire ring 210 and cage 214 are preferably formed of metal as described earlier. The cage 214 is fastened to the fire ring 210 so the cage 114 forms a hinge which allows the fire ring to be formed of two separate parts that move relative to each other and rotate about an axis parallel to the assembly longitudinal axis 16 with the cage 114. This motion allows the one side of the fire ring 210 and the cage 214 to separate enough so the pipe or tube 130 can fit through the separated parts and allow the cage 214 and the fire ring 210 to be retrofit to pre-installed pipes or tubes. This construction is explained in more detail later, but preferably has at least one portion of the fire ring portions overlapping each other during rotation.

The cage 214 is preferably formed of the same material and in the same general way as cage 14 except the feet 218 are bent inward instead of outward. The detailed description of the formation, assembly and use are sufficiently similar that such description is not repeated.

The length of the metal strip used to form cage 214 are also as generally described above but modified for the location of the intumescent ring 126 and inner smoke ring 128 by ends 204a,b, 208a,b and by the cage feet 218. As most passages 134 are cut to form cylindrical tubes, the metal strip forming cage 214 is oriented so the fold lines 149 align with the assembly longitudinal axis 116 and the strip is then bent at the fold lines 149 to form a cylinder. The two opposing ends of the sidewall 220 are defined by first and second end segments 150, 152 which may move toward and away from each other.

The end 127a of first intumescent ring portion 126a is advantageously flush with the distal end or circumferential end of first end segment 150, and the end 127b of the second intumescent ring portion 126b is advantageously flush with the distal end or circumferential end of the second end segment 152, so that as end segments 150, 152 approach and preferably contact each other, the circumferential ends 127a, 127b preferably approach and contact each other.

The mating first and second latch segments 154, 156 are formed on different ones of the end segments 150, 152 and positioned on those end segments so the mating latch portions can engage each other to hold the end segments of the sidewall 220 together and form a circular cage around the fire ring opening 112. The latch segments 154, 156 are like latch segments 54, 56 and not described in detail again.

For assembly and installation, the cage 214, or portions of the cage 214, are preferably bent at each fold line 149 to form a cylindrical cage that is centered along the assembly longitudinal axis 116 and encircles the opening 112, with the splayed cage feet 218 extending laterally inward. The cage 214 is then fastened to at least one retaining arm 206a, 206b and/or at least one support arm 202a, 202b. Spot welding is believed suitable to permanently connect the parts together and the splayed cage feet 218 provide a large surface for spot welding or otherwise connecting the parts together, such as by adhesives, mechanical fasteners, friction welding and other mechanisms which are preferably permanent.

The cage 214 forms a hinge when the fire ring halves, fire ring portions 210a, 210b, are connected to different portions of the cage 214. Advantageously, the cage 214 flexes about only one fold line 149 and that fold line 149 is the hinge line 149a that is aligned in a plane passing along the assembly longitudinal axis 116, the center of opening 112 and the juncture of the free (latched) ends of the sidewall 220 of the cage 214, ideally the free edges of end segments 150, 512. The hinge line 149a and assembly longitudinal axis 116 are thus preferably in the same plane. The juncture of the first and second fire ring portions 210a, 210b is advantageously on or adjacent to that same plane. Advantageously, that plane bisects the triangular shape of end 211d of the fire ring 210.

The use of a living hinge, hinge line 149a, reduces the outer diameter of the cage 14 to provide advantages described above. Advantageously, half of the cage 114 and its cage sidewall 210a is connected to first fire ring portion 210a and the other half of the cage and its cage sidewall 210b is connected to the second fire ring portion 210b, with both halves having a shared fold line 149 so the fire ring halves and the cage 214 hinge along and rotate along one vertical hinge line 149a. This provides advantages as described above regarding hinge 49a.

The fire ring 210 may have two straight, parallel sides parallel to the plane about which the two portions of the fire stop assembly open and close, with the straight sides overlapping the circular arrangement of the cage feet 218 so the cage feet 218 are cut off to end flush with the straight sides. The straight sides allow multiple fire stop assemblies to be used close together and also allow the fire ring 210 to fit inside or mate with plumbing brackets having predetermined shapes. But the straight sides are not required, and the fire ring 210 may have diverse shapes.

Scoring, rolling or stamping the sidewall 220 to form the fold lines 149 and hinge line 149a provides a cost effective way to produce and assemble the cage 214. This manufacturing and assembly technique has the disadvantage that repeated flexing of the fold line acting as hinge line 149a will lead to fatigue fracture of the hinge line 149a, especially when the sidewall 220 is made of metal. The material used to make the sidewall 20 and the method used to make the fold lines 149 are selected to produce a hinge line 149a that allows the fire stop portions to be opened a distance sufficient to encircle the expected tube 130 and then closed, at least five times and preferably ten times before there is any separation of the sidewall 210 along the hinge line 149a and more preferably the hinge line 149a at least partially separates between 3 and 20 opening and closing cycles. One opening and closing cycle moves the first and second end segments 150, 152 from the closed position to an open position where the first and second end segments 150, 152 are separated a distance corresponding to the maximum tube diameter for which the assembly is advertised for use—plus one inch.

The intumescent ring 126 is shown as formed of two concentric rings of material, each formed of a single, elongated strip of intumescent material that is curved into a circle to form an inner and outer ring. The number of concentric intumescent rings will vary with the application from a single intumescent ring, to several, depending on the amount of expansion in the lateral plane that is desired and the intumescent material. From one to three concentric intumescent rings, each about 0.2 to 0.3 inches thick, are believed sufficient for pipes four inches in diameter or smaller, with smaller thicknesses suitable for smaller diameter tubes of 0.5 to 1.5 inches outer diameter.

The inner and outer smoke rings 128, 132 are advantageously made of closed cell, thermoplastic urethane (TPU) or other suitable material, for the reasons and advantages described above regarding smoke rings 28, 32.

The portion of the intumescent ring 126 within the cage sidewall 220 is constrained by the cage sidewall 220 and the cage feet 218, the retaining arm 206a,b and the inner smoke ring 128 to expand inward and seal against the tube 130 (which can take the form of various wires, tubes, conduits, pipes or other elongated members) passing through the passage 134 through the concrete floor 136. Thus, at least the bottom end of the intumescent ring 126 is far enough from the fire ring 210 so that it extends into the passage 134 a distance sufficient that it can form a fluid and gas seal with the passage 134 through the concrete during a fire. The cage 214 with the end 208a,b, of the retaining arm 206a,b and inwardly extending cage feet 218 located so that about one half to one quarter of the axial length of the intumescent ring 126 measured along axis 116 extends beyond the bottom side of the cage sidewall 220, is believed suitable.

The assembly process for the fire stop assembly is roughly as follows. The two halves, the first and second fire ring portions 210a, 210b of the fire ring 210, are placed in the closed position and the cage 210 is bent into a cylinder encircling the assembly longitudinal axis 116. The cage 214 is spot welded or otherwise connected to the retaining arms 206a, 206b and/or support arms 202a, 202b on respective fire ring halves 210a, 210b so that the cage sidewall 220a is fastened to first fire ring portion 210a, and cage sidewall 220b is fastened to second fire ring portion 210b. The cage sidewalls 220a,b encircle the opening 112 in the fire ring 210, and are positioned before fastening so the end segments 150, 152 are located by the ends 211a,b of the fire ring 210. The inner smoke ring 128 is inserted between the ends 204a,b, 208a,b of the support arms 202a,b and retaining arms 208a,b, respectively. The inner smoke ring 128, as are all other rings described herein that open and close, are rotated about the assembly longitudinal axis 116 (or assembly longitudinal axis 16) so the free ends of the inner smoke ring 128 align with the circumferential edges of end segments 150, 152 (or 50, 52). The intumescent ring 126 is inserted into the inside of the cage 214 so the intumescent ring 126 is between the ends 208 of retaining arms 206a,b and the cage feet 218.

The intumescent ring 126 may be slit once, or slit twice to form two separable halves 126a, 126b with respective ends 127a, 127c on part 126a, and ends 127b, 127d on part 126b. Each opposing end of first intumescent ring portion 126a is advantageously located to extend to the circumferential end of the first and second end segments 150, 152. If the assembly were used only for passages with no preexisting tube 130, the intumescent ring 126 could be a continuous ring with no slit and inserted into the cage 220 before the cage portions 214a, 214b were latched together. The same applies to the inner smoke ring 128 and the mastic ring 138 could be continuous circular members and installed after the cage portions are connected in the closed position. In this variation where no tube 130 extends through the passage 134 when the assembly is placed into the passage 134, the overlapping ends 211a,b of the respective first and second fire ring portions 210a, 210b and/or cage 214 could be spot welded together or otherwise fastened together at the time of manufacture, or just before installation.

The basic drop-in fire stop assembly includes the fire ring 210, the cage 214, and the intumescent ring 126. The inner and outer smoke rings 128, 132 are optional, but preferably included. The inner opening on the inner smoke ring 128 is advantageously smaller in size than the expected size of the tube 130 so as to provide a resilient connection and a seal to prevent passage of smoke. An inner smoke ring 128 of ⅜ inch thick, closed cell TPU is believed suitable for pipes about 4 inches in diameter or smaller.

The outer smoke ring 132 is placed around the outer surface of the cage 214, preferably around the end of the cage 214 and its sidewall 220 near the fire ring 210 so as to axially overlap some, and preferably a majority of the axial length of the inner smoke ring 128. The outer smoke ring 132 may be fastened to the cage 214 using adhesives, mechanical interlocking connections or fasteners but is preferably just restrained in the circumferential grove formed by the sidewall 214 and ends 204a,b of the support arm 202a,b and the ends 208a,b of the retaining arm 206a,b, respectively. The outer smoke ring 132 of 3/16 inch thick, closed cell TPU is believed suitable for pipes about 4-6 inches in diameter. The outer diameter of the outer smoke ring 132 is selected to form an interference fit with the expected diameter or shape of the passage 134 so as to resiliently press against and seal against the passage 134. The order in which the intumescent ring 126, the inner smoke ring 128 and the outer smoke ring 132 are installed can vary.

The fire stop assembly is preferably configured to fit a range of different diameters of tube 130, with the tube diameters typically differing by one half inch in diameter for passages from 1 inch to 3 inches, and increasing by one inch for diameters from 4 to 8 inches in diameter, with larger ranges used as the pipe diameter increases. Thus, for example, the cage 214 could have an inner smoke ring 128 with an inner diameter configured to resiliently engage the tube 130 having a diameter of 3-4 inches, with the outer smoke ring 132 configured to resiliently engage a passage 134 having a diameter of about 4.5 to 5 inches, and with the intumescent ring 126 configured to block the passage 134 during a fire by expanding both inward and outward relative to the assembly longitudinal axis 116.

The installation and use of the assembly are described using a concrete floor 136, recognizing the orientation will be changed if the assembly is inserted into a hole through vertical wall or other inclined concrete slab. The assembly is usually installed after the concrete is poured, finished and hardened to form the wall or concrete floor 136. If not formed during pouring of the concrete floor, the hole 134 may be drilled or bored through a hardened concrete floor 136. Circular holes resulting in cylindrical passages are the predominant shape of the passage 134. A tube 130 (which includes pipes, conduits, wires or other elongated members) may be placed through the passage 134 before or after installation of the assembly.

If the tube 130 does not already extend through the passage 134 then once the assembly of the fire ring 210, the cage 214, the inner smoke ring 128, and the intumescent ring 126 is formed, the cage 214 and its sidewall portions 220a, 220b are latched together in the closed position. The cage-end of the latched-close assembly is inserted into the passage 134 from the top floor surface 136a of the concrete floor 136 and moved downward along the passage 134 until the fire ring 210 contacts the top concrete surface 136a (or mastic ring 138) whereupon the fire ring 210 is fastened to the concrete floor 136. Concrete fasteners are typically passed through fastener openings 144 in mounting tabs 148 to fasten the fire ring 210 and assembly to the concrete floor 136. Any stiffening ribs in the fire ring 210 preferably extend away from the concrete floor 136. Preferably, the assembly is inserted with at least one of the inner and outer smoke rings 128, 132 fastened in the assembly, but those smoke rings 128, 132 may be omitted. The assembly is preferably rotated about the assembly longitudinal axis 116 to achieve any advantageous fastening location presented by the top floor surface 136a of the concrete floor 136. It is possible, but less desirable, to have the mastic ring 138 fasten the fire ring 210 to the top floor surface 136a of the concrete floor 136, with the sidewall 220 cooperating with the passage 134 to laterally position the assembly on the floor 136.

The assembly can also be used to retrofit a preexisting passage 134 through a concrete wall or floor 136, which has a preexisting tube 130 (e.g., one or more pipes, wires, conduits or other elongated members) already extending through the passage. If a tube 130 already extends through the passage 134 then the assembly is spread apart to the open position, passed laterally across a portion of the tube and then closed to encircle the tube, after which the closed assembly is slid along the tube to insert the cage 214 into the passage until the fire ring can be fastened to the top floor surface 136a of the concrete floor 136. The assembly is spread apart to the open position by rotating the first portions of the fire ring 210a, sidewalls 220a, intumescent ring 126a, inner smoke ring 128a, outer smoke ring 132a together, and relative to the second portions of the fire ring 210b, sidewalls 220b, intumescent ring 126b, inner smoke ring 128b and outer smoke ring 132b. The two assembly portions rotate like a clam-shell device about the living hinge in the cage 214 to open and close.

After the axis of tube 130 is aligned with assembly axis 130, the two assembly portions are moved to the closed position. The first and second latch segments 154, 156 on the sidewall 220 of cage 214 engage to hold the parts together.

The various parts of the assembly may be connected as described above, except in this version it is useful to have the intumescent ring 126, inner smoke ring 128 and outer smoke ring 132 advantageously have at least one split line along which the adjacent ends of the intumescent ring 126, inner smoke ring 128 and outer smoke ring 132 can move apart to open in a clam-shell manner along with the cage 214, and close with the cage 214. These rings 126, 128, 132 may be rings with a single split that allows the split ends (e.g., 127a, 127b) to move apart to an open position while a portion of the ring opposite the split ends further apart than a bent portion which remains connected. These rings 126, 128, 132 may also have two separate segments as described later with each segment having open positions with one pair of ends that move much farther apart in the open position than a second pair of ends on the opposing side of the rings that remain adjacent each other but may physically separate in the open position. When closed, the assembly is slid along tube 130 until the fire ring 10 contacts the concrete floor whereupon the fire ring is preferably rotated to any desired position and fastened to the concrete floor 136.

Any slight gap or gaps in the adjacent ends of the intumescent ring 126, or the inner and outer smoke rings 128, 132 are believed small enough that they do not make the ability to block smoke during fires unacceptable. Also, because the clam-shell opening and closing motion makes the ends of the intumescent ring 126, the inner smoke ring 128 and outer smoke ring 132 approach each other in a tangential or circumferential direction, there is believed to be little or no gap between the ends that are opened and closed.

In the two segment version of the assembly mentioned above, the intumescent ring 126, the inner smoke ring 128 and the outer smoke ring 132 are split twice to form two separate and separable parts that are separately connected to the respective assembly portions of the cage sidewalls 120a,b. The inner smoke ring 128 is placed inside the intumescent ring 126 with the ends 129a, 129b, 129c, 129d aligned with the diameter through the assembly longitudinal axis 116 and the hinge line or the connection between end segments 150, 152. The inner smoke ring portions 128a, 128b are connected to the respective intumescent ring portions 126a, 126b with the ends 129a, 129b, 129c, 129d aligned with the respective ends 126a, 126b, 216c, 126d of the intumescent ring 126 to form an annular encircling smoke ring in the closed position and an open, clam-shell position to encircle the tube 130 in the open position. The connection between the inner smoke ring 128 and the intumescent ring 126 is as described above, preferably by adhesives or various retention mechanisms, including mechanical fasteners. The inner smoke ring 218 is preferably annular in shape when the cage 214 is in the closed position and has an inner diameter sized to abut against an outer diameter of an expected tube (e.g., pipe(s), wire or cable bundle(s), conduit(s), or one or more other elongated members) passing through the passage 314.

In the assembly using two separate and separable portions on the various rings, the outer smoke ring 132 is placed outside of and connected to the intumescent ring 126 or more preferably, outside the cage sidewall 220, with the ends 133a, 133b, 133c and 133d aligned with the plane through the axis 116 and the hinge line or the connection between end segments 150, 152. The outer smoke ring portions 133a, 133b are connected to the respective intumescent ring portions 126a, 126b or connected to the cage sidewall 120 with the ends of the outer smoke ring 133a, 133b, 133c, 133d aligned with the respective ends 126a, 126b, 126c, 126d of the intumescent ring 126 or aligned with the end segments 150, 152 and the diametrically opposite segments of the sidewall 220 to form an annular encircling outer smoke ring 132 in the closed position and an open, clam-shell position to encircle the tube 130 in the open position. The connection between the outer smoke ring 132 and the intumescent ring 126 or cage sidewalls 220a,b is as described above, preferably by adhesives or various permanent retention mechanisms such as impaling or mechanical fasteners. The outer smoke ring 132 is preferably annular in shape when the cage 214 is in the closed position and has an outer diameter sized to abut against an inner diameter or wall of the passage 134.

Once the clamshell fire ring 210, the cage 214 and the rings 126, 128, 132 are in the closed position encircling the tube 130, the fire ring 210 may have its fire ring portions 210a, 210b fastened together (preferably releasably fastened together) by the engaging first and second latch segments 154, 156 on cage 214 and then fastening the fire ring is optionally fastened to the top floor surface 136a of the concrete floor as described above after sliding the assembly along the tube 130—to the extent needed to achieve the connection with top floor surface 136a.

During a fire, the heat and smoke pass upward, with the inner and outer smoke rings 128, 132 blocking passage of the smoke through the passage 134. The smoke rings are made of a fire resistant material and may be made of an open cell intumescent material to allow compressibility, but lack the large expansion coefficient of the intumescent material. As the heat and smoke rise from the bottom of the passage 134 toward the top concrete surface 136a, the intumescent ring expands inward toward tube 130 to seal the passage 134.

The outer smoke ring 132 prevents hot smoke and heat from escaping and directs such hot smoke back into the passage 134, with the mastic ring 138 advantageously adhering the fire stop 210 to the top floor surface 136a of the concrete to provide a further containment barrier for smoke, and to hold the fire ring 210 and assembly in position while providing a moisture barrier. The outer smoke ring 132 is located at the fire ring 210 near the top of the passage 134 and thus helps trap the hot smoke and heat in the annular space between the cage 214 and passage 134 so as to rapidly heat the intumescent ring 126. The inner smoke ring 132 is advantageously fastened concentric with the outer smoke ring 132 so the smoke rings 128, 132 overlap along a major portion of the axial length of the smoke rings and preferably overlap along 80% or more of the axial length. As the intumescent ring 126 is heated and expands the cage 214 prevents the portion of the intumescent ring inside the cage sidewalls 220a,b from expanding outward so the expansion of the intumescent ring 126 is directed to expand inward and press against the tube 130, collapsing and pressing the inner smoke ring 132 against and into the tube 130. The number of rings in the intumescent ring 126 being selected to compress the tube 130 and seal the entire passage formed by the tube 130.

The inner and outer smoke rings 128, 132 provide initial barriers to the passage of smoke and heat through the passage 134 at lower temperatures, with the intumescent ring 126 providing a stronger barrier but only after the higher temperatures is reached that is needed to expand the intumescent ring. The inner and outer smoke rings 128, 132 (and 28, 32) are preferably of material that does not degrade during fires, and may include intumescent material that expands at the elevated temperatures reached during fires.

The cage 214 and its cage sidewall 220 are preferably cylindrical in shape, but other shapes can be used as the fold lines 149 allow the cage 214 to have various configurations. Depending on the shape of the cage 214, the shape of the opening 112 will also vary, usually to conform to the outer cross-sectional shape of the tube 130. The same applies to the cage 14, sidewall 20 and tube 30. Thus, for example, tubes with rectangular cross-sections can be used.

There is thus provided a fire stop assembly that may be installed in a passage 134 before any tube 130 is placed through the passage 134, and that may also be retrofit to passages 134 where a tube 130 already extends through the passage 134. There is also provided an apparatus that restricts the passage of smoke through the passage 314 during the start of a fire, before the temperature increases sufficiently to expand the intumescent material. Further, by blocking passage of smoke past the inner and outer smoke barriers 128, 132, those smoke barriers cause the temperature to increase at the location of the intumescent ring 126 and accelerate the expansion of that intumescent ring. The location of the entire intumescent ring 126 into the passage 134 also allows lateral expansion of the intumescent ring to provide and ensure a complete seal of the passage 134.

The above description is given by way of example, and not limitation. Given the above disclosure, one skilled in the art could devise variations that are within the scope and spirit of the invention. Further, the various features of this invention can be used alone, or in varying combinations with each other and are not intended to be limited to the specific combination of features shown and described herein.

What is claimed is:

1. A drop-in fire stop assembly for a passage extending through a hardened concrete slab having a top surface into which the assembly is inserted, the fire stop assembly having an assembly longitudinal axis along which a tube may extend, the fire stop assembly comprising:
    a fire ring having first and second fire ring portions that rotate about a rotational axis aligned with the assembly longitudinal axis between an open and closed position, the first fire ring portion having a first free fire ring end and the second fire ring portion having a second free fire ring end, the first and second fire ring free ends being adjacent each other in the closed position and apart from each other in the open position, the first and second fire ring portions having respective first and second inner peripheries forming a portion of a circular opening and cooperating to define a circular fire ring opening centered on the assembly longitudinal axis when in the closed position;
    first and second retaining arms located around the respective first and second inner peripheries and extending a first distance along the assembly longitudinal axis, with first and second retaining arm ends extending inward from the respective first and second retaining arms;
    first and second support arms located around the respective first and second inner peripheries and extending a second distance along the assembly longitudinal axis, with first and second support arm ends extending inward from the respective first and second support arms, the first and second support arm ends located closer to the fire ring than the first and second retaining arm ends when measured along the assembly longitudinal axis;
    a cylindrical cage having first and second sidewall portions connected to the respective first and second fire ring portions and extending a predetermined distance along the assembly longitudinal axis, each sidewall portion rotating between the open and closed positions with the respective first and second fire ring portions, the first sidewall portion having a first free sidewall end segment and the second fire ring portion having a second free fire ring end segment, the first and second free fire ring end segments being adjacent each other in the closed position and spaced apart from each other in the open position, the first and second sidewall portions cooperating when in the closed position to encircle the assembly longitudinal axis, each sidewall portion having a plurality of cage feet extending inward from a bottom end of the sidewall portion, the first and second retaining arm ends located intermediate the cage feet and support arm ends when measured along the assembly longitudinal axis, the cylindrical cage encircling and being fastened to at least one of the first and second support arms or the first and second retaining arms; and
    a split intumescent ring having first and second intumescent ring portions each located inside the respective first and second cage portions between the retaining arm ends and the cage feet, the first and second intumescent ring portions each having a respective first and second intumescent ring free end which intumescent ring free ends being spaced apart in the open position and adjacent each other in the closed position to define an intumescent ring opening centered around the assembly longitudinal axis.

2. The fire stop assembly of claim 1, wherein the first and second sidewall portions each have a plurality of sidewall segments separated from each other by a fold line aligned with the assembly longitudinal axis so the sidewall segments can bend along the fold line, with the rotational axis of the fire ring coinciding with one of the fold lines.

3. The fire stop assembly of claim 2, wherein the first sidewall portion has a first free sidewall end segment, the second sidewall portion has a second free sidewall end segment, the first and second free sidewall end segments are fastened together to restrain separation of the first and second free sidewall end segments.

4. The fire stop assembly of claim 2, wherein the first and second sidewall portions are joined together by a living hinge aligned with the assembly longitudinal axis so the sidewall portions can rotate between the open and closed positions along the living hinge.

5. The fire stop assembly of claim 1, further includes respective first and second inner smoke ring portions located inside the respective first and second cage portions and between the respective first and second retaining arm portions and the respective first and second support arm portions, the first and second inner smoke ring portions having respective first and second inner smoke ring free ends which are spaced apart from each other in the open position and adjacent to or contacting each other in the closed position, the first and second inner smoke ring portions extending inward toward the longitudinal axis.

6. The fire stop assembly of claim 5, further includes respective first and second outer smoke ring portions located outside the respective first and second sidewall portions and located adjacent the fire ring, the outer smoke ring portions and having respective first and second outer smoke ring free ends which are spaced apart from each other in the open position and adjacent to or contacting each other in the closed position.

7. The fire stop assembly of claim 1, further include respective first and second outer smoke ring portions located outside the respective first and second sidewall portions and located adjacent the fire ring, the outer smoke ring portions and having respective first and second outer smoke ring free ends which are spaced apart from each other in the open position and adjacent to or contacting each other in the closed position.

8. A drop-in fire stop assembly for use with a cylindrical passage extending along an assembly longitudinal axis through a hardened concrete slab having opposing first and second surfaces, the fire stop assembly comprising:
a fire ring attachable to the first surface, the fire ring having first and second fire ring portions capable of rotating about an assembly axis that is parallel to the assembly longitudinal axis, the first and second fire ring portions defining a circular fire ring opening centered on the assembly longitudinal axis, the first and second fire ring portions each having a free fire ring end opposite the assembly axis;
a cage having curved first and second sidewall portions connected to the respective first and second fire ring portions and located to encircle the fire ring opening, each first and second sidewall portion extending along the longitudinal axis and hinged to rotate about the assembly axis which is located on and extends along one of the sidewall portions, each first and second sidewall portion having a respective first and second free sidewall end segment which free sidewall end segments are connected to resist separation of the free sidewall end segments; and
an intumescent ring inside of the respective first and second sidewall portions;
wherein the cage includes a plurality of retaining arms inside of the cage and extending from the fire ring toward the intumescent ring, each retaining arm having an inwardly extending retaining arm end.

9. The fire stop assembly of claim 8, wherein the intumescent ring comprises first and second intumescent ring portions each having a respective first and second intumescent ring free end which intumescent ring free ends are located at the respective first and second free sidewall end segments so the intumescent ring can rotate with the first and second sidewall portions about the assembly longitudinal axis between a closed position in which the first and second intumescent ring free ends are either adjacent each other or contacting each other, and an open position in which the first and second intumescent ring free ends are spaced apart from each other.

10. The fire stop assembly of claim 8, further includes an inner smoke ring having first and second inner smoke ring portions located inside the respective first and second sidewall portions and between the intumescent ring and the fire ring.

11. The fire stop assembly of claim 10, wherein the inwardly extending retaining arm end of each retaining arm is located to support the inner smoke ring and restrain it from axial movement toward the intumescent ring and to limit motion of the intumescent ring toward the fire ring and limit motion of the inner smoke ring.

12. The fire stop assembly of claim 11, further comprising a plurality of support arms inside of the cage of the cage and extending from the fire ring toward the intumescent ring, each support arm having an inwardly extending support arm end located inside the passage and limiting movement of the inner smoke ring toward the fire ring.

13. The fire stop assembly of claim 8, further comprising an outer smoke ring having first and second outer smoke ring portions located outside of the cage and connected to the respective first and second sidewall portions and located at the top of the passage and adjacent the fire ring.

14. The fire stop assembly of claim 8, further comprising at least one tube extending through the passage, the intumescent ring, the cage and the opening in the fire ring.

15. The fire stop assembly of claim 10, further comprising at least one tube extending through the passage, the intumescent ring, the cage, the inner smoke ring and the opening in the fire ring.

16. The fire stop assembly of claim 8, wherein each first and second sidewall portion has a respective first and second plurality of feet extending inward from a bottom end of the first and second sidewall portions, the intumescent ring has a bottom end supported in the axial direction by the first and second plurality of feet to restrain downward movement of the intumescent ring.

17. A drop-in fire stop assembly for a cylindrical passage having a longitudinal axis extending through a hardened concrete slab with the passage sized to allow a tube to pass through the passage, the fire stop assembly comprising:
a cage having a sidewall encircling the assembly axis and having a living hinge rotating about a hinge axis parallel to the longitudinal axis to form first and second sidewall portions on opposing sides of a plane through the longitudinal axis and the hinge axis, each first and second sidewall portion having respective first and second sidewall free ends, the cage having a first closed position where the first and second free sidewall ends are together and having an open second position in which the first and second sidewall free ends are separated from each other a distance sufficient to allow the tube to pass between the sidewall free ends, the cage having inwardly extending cage feet on a bottom of the cage;
a fire ring having first and second fire ring portions each connected to the respective first and second sidewall portion, the first and second fire ring portions cooperating to define a circular opening encircling the longitudinal axis during use, the fire ring having retaining arms extending along the inside of the cage and along the longitudinal axis and having retaining arm ends extending inward, the fire ring having support arms extending along the inside of the cage and extending along the inside of the cage and along the longitudinal axis with the cage fastened to at least one of the retaining arms or support arms; and
an intumescent ring having first and second intumescent ring portions inside the respective first and second sidewall portions and between the cage feet and the retaining arm ends, the intumescent ring having first and second intumescent ring free ends that are together when the cage is in the closed position and separated from each other a distance sufficient to allow the tube to pass between the intumescent ring free ends when the cage is in the open position.

18. The fire stop assembly of claim 17, wherein the cage sidewalls are fastened together in the closed position.

19. The fire stop assembly of claim 17, further comprising an inner smoke ring extending inward and located inside the cage and between the support arm ends and the retaining arm ends.

20. The fire stop assembly of claim 17, further comprising an outer smoke ring extending outward and located on the outside of the cage at an axial location between the support arm ends and the retaining arm ends.

21. A drop-in fire stop assembly for use with a cylindrical passage extending along an assembly longitudinal axis through a hardened concrete slab having opposing first and second surfaces, the fire stop assembly comprising:

a fire ring attachable to the first surface, the fire ring having first and second fire ring portions capable of rotating about an assembly axis that is parallel to the assembly longitudinal axis, the first and second fire ring portions defining a circular fire ring opening centered on the assembly longitudinal axis, the first and second fire ring portions each having a free fire ring end opposite the assembly axis;

a cage having curved first and second sidewall portions connected to the respective first and second fire ring portions and located to encircle the fire ring opening, each first and second sidewall portion extending along the longitudinal axis and hinged to rotate about the assembly axis which is located on and extends along one of the sidewall portions, each first and second sidewall portion having a respective first and second free sidewall end segment which free sidewall end segments are connected to resist separation of the free sidewall end segments;

an intumescent ring inside of the respective first and second sidewall portions; and an inner smoke ring having first and second inner smoke ring portions located inside the respective first and second sidewall portions and between the intumescent ring and the fire ring.

22. A drop-in fire stop assembly for use with a cylindrical passage extending along an assembly longitudinal axis through a hardened concrete slab having opposing first and second surfaces, the fire stop assembly comprising:

a fire ring attachable to the first surface, the fire ring having first and second fire ring portions capable of rotating about an assembly axis that is parallel to the assembly longitudinal axis, the first and second fire ring portions defining a circular fire ring opening centered on the assembly longitudinal axis, the first and second fire ring portions each having a free fire ring end opposite the assembly axis;

a cage having curved first and second sidewall portions connected to the respective first and second fire ring portions and located to encircle the fire ring opening, each first and second sidewall portion extending along the longitudinal axis and hinged to rotate about the assembly axis which is located on and extends along one of the sidewall portions, each first and second sidewall portion having a respective first and second free sidewall end segment which free sidewall end segments are connected to resist separation of the free sidewall end segments;

an intumescent ring inside of the respective first and second sidewall portions; and an outer smoke ring having first and second outer smoke ring portions located outside of the cage and connected to the respective first and second sidewall portions and located at the top of the passage and adjacent the fire ring.

23. A drop-in fire stop assembly for use with a cylindrical passage extending along an assembly longitudinal axis through a hardened concrete slab having opposing first and second surfaces, the fire stop assembly comprising:

a fire ring attachable to the first surface, the fire ring having first and second fire ring portions capable of rotating about an assembly axis that is parallel to the assembly longitudinal axis, the first and second fire ring portions defining a circular fire ring opening centered on the assembly longitudinal axis, the first and second fire ring portions each having a free fire ring end opposite the assembly axis;

a cage having curved first and second sidewall portions connected to the respective first and second fire ring portions and located to encircle the fire ring opening, each first and second sidewall portion extending along the longitudinal axis and hinged to rotate about the assembly axis which is located on and extends along one of the sidewall portions, each first and second sidewall portion having a respective first and second free sidewall end segment which free sidewall end segments are connected to resist separation of the free sidewall end segments;

an intumescent ring inside of the respective first and second sidewall portions; and at least one tube extending through the passage, the intumescent ring, the cage, an inner smoke ring and the opening in the fire ring, wherein the inner smoke ring is located inside the respective first and second sidewall portions and between the intumescent ring and the fire ring.

* * * * *